(12) United States Patent
Atlas et al.

(10) Patent No.: US 9,485,118 B1
(45) Date of Patent: Nov. 1, 2016

(54) PENALTY-BOX POLICERS FOR NETWORK DEVICE CONTROL PLANE PROTECTION

(71) Applicant: Juniper Networks, Inc., Sunnyvale, CA (US)

(72) Inventors: Alia Atlas, Arlington, MA (US); John Galen Scudder, Ann Arbor, MI (US); Ross W. Callon, Westford, MA (US); Stu Grossman, San Francisco, CA (US); Qi-Zhong Cao, Southborough, MA (US); Jeffrey Haas, Ypsilanti, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 765 days.

(21) Appl. No.: 13/631,652

(22) Filed: Sep. 28, 2012

(51) Int. Cl.
*H04L 12/54* (2013.01)
*H04L 12/801* (2013.01)

(52) U.S. Cl.
CPC ........... *H04L 12/5695* (2013.01); *H04L 47/10* (2013.01)

(58) Field of Classification Search
CPC ... H04L 12/5695; H04L 47/10; H04L 47/11; H04L 47/12; H04L 47/15; H04L 47/20
USPC ........................................ 370/230, 235, 238
See application file for complete search history.

(56) References Cited

U.S. PATENT DOCUMENTS

| | | | |
|---|---|---|---|
| 6,721,273 B1 * | 4/2004 | Lyon | H04L 49/255 370/235 |
| 7,295,516 B1 * | 11/2007 | Ye | H04L 47/10 370/232 |
| 7,522,521 B2 | 4/2009 | Bettink et al. | |
| 7,580,351 B2 | 8/2009 | Bettink et al. | |
| 7,733,777 B1 * | 6/2010 | Sridharan et al. | ............. 370/231 |
| 2003/0179720 A1 * | 9/2003 | Cuny | ............................ 370/310 |
| 2004/0037223 A1 * | 2/2004 | Harrison et al. | ............... 370/235 |
| 2004/0233849 A1 * | 11/2004 | Cole | ................... H04L 63/1458 370/238 |
| 2006/0221820 A1 * | 10/2006 | Zeitak | ........................... 370/229 |
| 2008/0044181 A1 | 2/2008 | Sindhu | |
| 2008/0062876 A1 * | 3/2008 | Giroux et al. | ................ 370/235 |

(Continued)

OTHER PUBLICATIONS

Arnaud Jacquet, A path-aware rate policer: design and comparative evaluation, 2005, pp. 1-12.*

(Continued)

*Primary Examiner* — Michael Thier
*Assistant Examiner* — Prince A Mensah
(74) *Attorney, Agent, or Firm* — Shumaker & Sieffert, P.A

(57) ABSTRACT

In general, techniques are described for dynamically controlling host-bound traffic by dynamically adding and updating, within the forwarding plane of a network device, network packet policers that each constrains, for one or more packet flows, an amount of host-bound traffic of the packet flows permitted to reach the control plane in accordance with available resources. In one example, a control plane of the network device detects internal congestion in the communication path from the forwarding plane to control plane (the "host-bound path"), identifies packet flows utilizing an excessive amount of host-bound path resources, computes limits for the identified packet flows, and adds "penalty-box policers" configured with the computed limits for the identified packet flows to the forwarding plane. The forwarding plane subsequently applies the policers to the identified packet flows to constrain the amount of traffic of the packet flows allowed to reach the control plane to the computed limits.

24 Claims, 8 Drawing Sheets

(56) References Cited

U.S. PATENT DOCUMENTS

| | | | | |
|---|---|---|---|---|
| 2008/0130502 | A1* | 6/2008 | Charny | H04L 47/10 370/235 |
| 2009/0003212 | A1* | 1/2009 | Kwan | H04L 49/508 370/235 |

OTHER PUBLICATIONS

U.S. Appl. No. 13/194,571, filed Jul. 29, 2011 entitled Packet Forwarding Path Programming Using a High-Level Description Language.

* cited by examiner

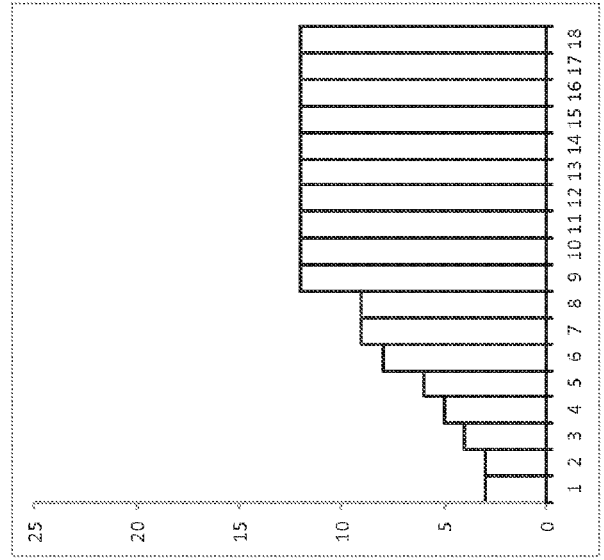
FIG. 7A
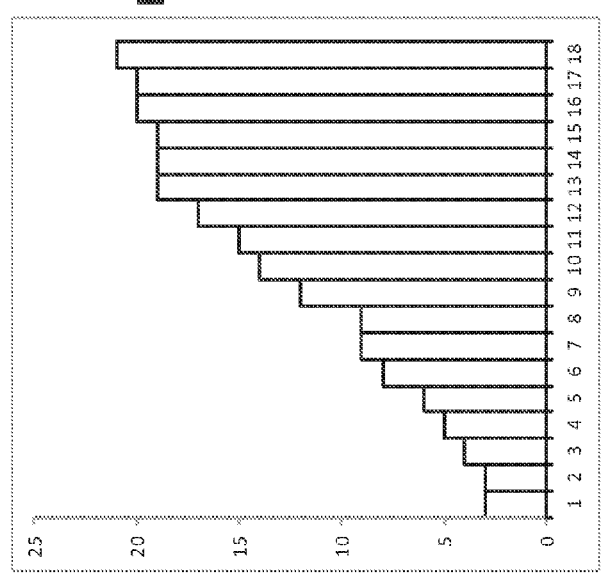
FIG. 7C
| k | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|----|----|----|----|----|----|----|----|----|
| $bucket_k$ | 3 | 3 | 4 | 5 | 6 | 8 | 9 | 9 | 12 | 14 | 15 | 17 | 19 | 19 | 19 | 20 | 20 | 21 |
| $Chunk\_traffic$ | 54 | 0 | 16 | 15 | 14 | 26 | 12 | 0 | 30 | 18 | | | | | | | | |
| $unallocated\_traffic_i$ | 113.25 | 113.25 | 97.25 | 82.25 | 68.25 | 42.25 | 30.25 | 30.25 | 0.25 | | | | | | | | | |
FIG. 7B

PENALTY-BOX POLICERS FOR NETWORK DEVICE CONTROL PLANE PROTECTION

TECHNICAL FIELD

The invention relates to computer networks and, more specifically, to network device control plane protection.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding units for routing or switching data units. In some cases, for example, a network device may include a plurality of forwarding units and a switch fabric that collectively provide a forwarding plane for forwarding network packets.

For example, the control plane functions provided by the control unit of a router include storing network topologies in the form of a routing information base (RIB), executing routing protocols to communicate with peer routing devices to maintain and update the RIB, providing a management interface to allow user access and configuration of the network device, responding to Address Resolution Protocol (ARP) requests, and/or other control plane functions. Thus, in addition to receiving and processing network packets destined for other network devices, including end-user devices, application servers, database servers, routers, and so forth, a network device also receives network packets directed to the network device itself. The control plane receives these "host-bound" packets (collectively, host-bound traffic) from the forwarding plane and processes the host-bound traffic to carry out control plane functions.

SUMMARY

In general, techniques are described for dynamically controlling host-bound traffic by dynamically adding and updating, within the forwarding plane of a network device, network packet policers that each constrains, for one or more packet flows, an amount of host-bound traffic of the packet flows that is permitted to reach the control plane in accordance with available resources. In one example, a control plane of the network device detects internal congestion in the communication path from the forwarding plane to control plane (i.e., the "host-bound path"), identifies packet flows utilizing an excessive amount of host-bound path resources, computes limits for the identified packet flows, and adds "penalty-box policers" configured with the computed limits for the identified packet flows to the forwarding plane. The forwarding plane subsequently applies the penalty-box policers to the identified packet flows to constrain the amount of traffic of the packet flows allowed to reach the control plane to the computed limits.

In this way, the control plane may intelligently prioritize discarding of host-bound traffic in the forwarding plane when there is congestion in the control plane's host-bound path due, for example, to resource exhaustion. The techniques may therefore dynamically prevent some legitimate packet flows from acquiring more than their fair share of resources so that other legitimate flows have access to sufficient resources to maintain and progress the respective, corresponding protocol sessions. Moreover, unlike static policer configurations, the techniques may permit packet discard that is work-conserving in that the dynamically controlled penalty-box policers discard packets only when the host-bound path is congested. In other words, so long as resources remain available, a high-traffic packet flow that would otherwise exceed a statically configured policer limit may pass unconstrained to the control plane.

In one aspect, a method includes receiving, with a forwarding unit of a network device, a plurality of packet flows that each comprises host-bound traffic, wherein the forwarding unit comprises a forwarding unit processor and a forwarding component that processes the packet flows and forwards the packet flows to a control unit of the network device. The method also includes detecting, with the forwarding unit processor, congestion of a host-bound path from the forwarding component to the control unit that is caused by forwarding the packet flows. The method further includes, responsive to detecting the congestion and with the forwarding unit processor, configuring a policer of the forwarding component with identifying features for a first one of the packet flows to constrain a rate at which the forwarding component forwards the first packet flow to the control unit.

In another aspect, a method includes receiving, with a forwarding plane of a network device, a plurality of packet flows that each comprises host-bound traffic and forwarding the packet flows from the forwarding plane on a host-bound path to a control plane of the network device. The method also includes executing protocols each associated with one or more protocol groups with the control plane, wherein each of the protocol groups is associated with a goal weight that defines a share of host-bound path resources available to the protocol groups, and wherein a first packet flow of the plurality of packet flows is associated with a first one of the protocol groups associated with a first goal weight. The method also includes determining host-bound traffic for the first protocol group exceeds the first goal weight. The method further includes, responsive to determining the host-bound traffic for the first protocol exceeds the first goal weight, selecting the first packet flow to constrain based at least on the association of the first packet flow with the first protocol group and configuring the forwarding plane for the first packet flow to constrain a rate at which the forwarding plane forwards the first packet flow to the control plane.

In another aspect, a network device includes a control unit having one or more processors. The network device also includes a forwarding unit having a forwarding unit processor and a forwarding component, wherein the forwarding unit receives a plurality of packet flows that each comprises host-bound traffic, wherein the forwarding component processes the packet flows and forwards the packet flows to the control unit. The network device also includes a dynamic policing module executed by the forwarding unit processor that detects congestion of a host-bound path from the forwarding component to the control unit that is caused by forwarding the packet flows, wherein the dynamic policing module, responsive to detecting the congestion, configures a policer of the forwarding component with identifying features for a first one of the packet flows to constrain a rate at which the forwarding component forwards the first packet flow to the control unit.

In another aspect, a network device includes a control plane that executes protocols each associated with one or more protocol groups, wherein each of the protocol groups is associated with a goal weight that defines a share of host-bound path resources available to the protocol groups. The network device also includes a forwarding plane that receives a plurality of packet flows that each comprises host-bound traffic and forwarding the packet flows from the forwarding plane on a host-bound path to the control plane, wherein a first packet flow of the plurality of packet flows is associated with a first one of the protocol groups associated with a first goal weight, wherein the control plane determines host-bound traffic for the first protocol group exceeds the first goal weight, wherein the control plane, responsive to determining the host-bound traffic for the first protocol exceeds the first goal weight, selects the first packet flow to constrain based at least on the association of the first packet flow with the first protocol group, and wherein the control plane configures the forwarding plane for the first packet flow to constrain a rate at which the forwarding plane forwards the first packet flow to the control plane.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 7A-7C illustrate an example computation of a packet limit for a protocol group in accordance with techniques described herein.

Like reference characters denote like elements throughout the figures and text.

DETAILED DESCRIPTION

Figure 1:
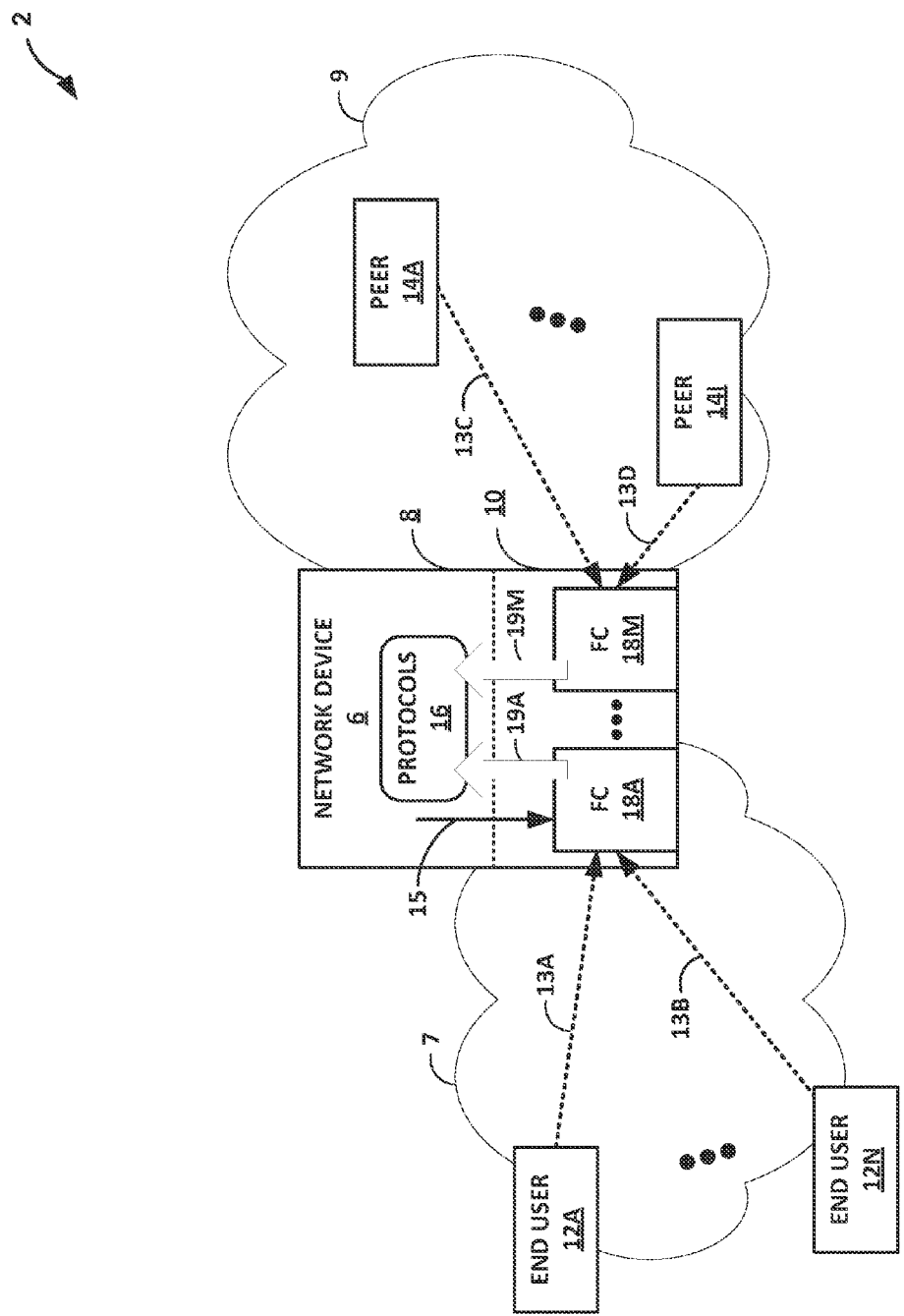
FIG. 1 is a block diagram illustrating a network system in which a network device communicates, according to various protocols, with other network devices of the network system to receive host-bound traffic and, in accordance with techniques described herein, dynamically installs penalty-box policers to forwarding plane components of the network device to dynamically limit host-bound traffic for one or more packet flows.

FIG. 1 is a block diagram illustrating a network system in which a network device communicates, according to various protocols, with other network devices of the network system to receive host-bound traffic and, in accordance with techniques described herein, dynamically installs penalty-box policers to forwarding plane components of the network device to dynamically limit host-bound traffic for one or more packet flows. Network device 6 of network system 2 is logically and/or physically partitioned into control plane 8 and forwarding plane 10. Control plane 8 includes hardware and software components that execute network protocols 16 (illustrated as "protocols 16") to exchange network packets with other network devices of networks 7, 9 to perform control plane functions of network device 6. Network 7 may represent an access network, such as a cellular or broadband access network, and end users 12A-12N (collectively, "end users 12") of network 7 may each represent customer-premises equipment (CPE) such as a cable or Digital Subscriber Line (DSL) modems, a smart phone or tablet, a television set-top box, a desktop or laptop computer, a gaming system, and so forth. Network device 6 may operate as an access device, such as a Broadband Services Router (BSR), Broadband Remote Access Server (BRAS), or Packet Data Network (PDN) gateway (PGW), or Gateway Generic Packet Radio Service (GPRS) Serving Node (GGSN), to provide services accessible via network 9. End users 12 each execute one or more of protocols 16 to exchange protocol messages with network device 6. In the illustrated example, end users 12A, 12N issue respective packet flows 13A, 13B, including protocols messages for one or more of protocols 16, to network device 6.

Network 9 may represent a service provider network, another autonomous system or autonomous system area (e.g., an Open Shortest Path First (OSPF) area), or the Internet, for instance. Network 9 may couple to one or more additional networks, such as the Internet or other PDN, to provide accessibility to services of the additional networks. Peer devices 14A-14I (illustrated as and collectively referred to as "peers 14") of network 9 are protocol peers of network device 6 and each execute one or more of protocols 16 to exchange protocol messages with network device 6. In the illustrated example, peers 14A, 14I issue respective packet flows 13C, 13D, including protocol messages for one or more of protocols 16, to network device 6. Network packets, such as those that constitute packet flows 13A-13D, directed to network device 6 (e.g., having a destination address that is a network address of network device 6) are referred to as "host-bound" packets (collectively, host-bound traffic). While generally described herein as performing the functions of a network router, network device 6 may represent in some examples an L2, L3, an L2/L3 switch, or other network device that communicates with other network devices using L2 and L3 protocols to receive host-bound traffic.

Control plane functions of control plane 8 may include exchanging routing information with other network devices, maintaining peering sessions for routing protocols to enable continued exchange of routing information, responding to Address Resolution Protocol (ARP) requests, receiving and responding to configuration requests, establishing Label Switched Paths (LSPs) and reserving resources for LSPs, exchanging multicast information with peers, and handling network packets having expired Time-to-Live values, for instance. Accordingly, protocols 16 includes one or more corresponding protocols for exchanging protocol messages with other devices in order to carry out the control plane functions performed by control plane 8. For example, protocols 16 may include ARP, Internet Configuration Management Protocol (ICMP), ICMPv6, Simple Network Management Protocol (SNMP), Link Aggregation Control Protocol (LACP), Internet Group Management Protocol (IGMP), Protocol Independent Multicast (PIM), Border Gateway Protocol (BGP), Interior Gateway Protocols such as OSPF and Intermediate System-to-Intermediate System (IS-IS), Resource Reservation Protocol (RSVP), Label Distribution Protocol (LDP), for example. Based on control or "signaling" information received in protocol messages for protocols 16 from end users 12 and/or peers 14, control plane 8 updates a configuration for components of forwarding plane 10 of network device 6 to direct forwarding of transit network packets (i.e., network packets that are not host-bound vis-à-vis network device 6).

Forwarding plane 10 (alternatively referred to as a "data plane") represents hardware or a combination or hardware and software that forwards network traffic in accordance with a configuration updated by control plane 8. Forwarding plane 10, in this example, include one or more forwarding components 18A-18M (collectively, "forwarding components 18") that each provides high-speed forwarding of network traffic received by interface cards (not shown in FIG. 1) via inbound links (not shown in FIG. 1). Each of forwarding components 18 may represent one or more forwarding Application-Specific Integrated Circuits (ASICs), such as packet forwarding engines (PFEs), or other logic that is configurable to direct host-bound traffic toward control plane 8 and to forward transit network traffic in accordance with routing, management, and other control information received by the execution of protocols 16 by control plane 8 or by a management interface, for instance. Example details of a network router in which a control plane programs a forwarding plane with forwarding structures are described in U.S. patent application Ser. No. 13/194,571, filed Jul. 29, 2011, and entitled "PACKET FORWARDING PATH PROGRAMMING USING A HIGH-LEVEL DESCRIPTION LANGUAGE," the entire contents of which are incorporated herein by reference.

In addition to forwarding transit network traffic between ingress and egress interfaces, forwarding components 18 forward any host-bound traffic (i.e., traffic destined for network device 6 itself) to control plane 8 by a host-bound path that connects forwarding plane 10 to control plane 8. Specifically, forwarding component 18A forwards host-bound traffic 19A toward control plane 8, while forwarding component 18M forwards host-bound traffic 19M. In the illustrated example, for instance, forwarding component 18M receives and forwards packet flows 13C, 13D as host-bound traffic 19M to control plane 8 of network device 6. In some examples, one or more of forwarding components 18 may be physically located on a single forwarding unit (e.g., a line card) and respective host-bound traffic 19 forwarded by the co-located forwarding components may be merged on the forwarding unit to constitute a single stream of host-bound traffic. Control plane 8 receives the host-bound packets from forwarding components 18 and processes the host-bound traffic to carry out control plane functions.

In some circumstances, host-bound traffic received by forwarding components 18 may exceed resources available to control plane 8 to process the host-bound traffic and/or exceeds resources available on a host-bound path from forwarding components 18 to control plane 8. Those resources that are available to control plane 8 are oversubscribed or "congested," and this congestion may be based upon system constraints, subsystem constrains, or upon policy constraints. For instance, a Direct Memory Access (DMA) bandwidth or other bandwidth or resource limitation for the host-bound path between any of forwarding components 18 and control plane 8 may be exceeded by a rate of the inbound host-bound traffic received by the forwarding component. As another example, control plane 8 components may be able to process only certain limits of BGP traffic, ARP packets, a number of Transmission Control Protocol (TCP) or User Datagram Protocol (UDP) sessions, or other types of one or more host-bound packet flows. In some instances, policies configured in control plane 8 establish these limits. Host-bound path resources may thus include, for example, communication link bandwidth, CPU utilization, set policy limits for processes, queue limits.

To protect control plane 8 resources, and in accordance with techniques described herein, control plane 8 dynamically configures forwarding components 18 to prioritize, among the network packet flows that constitute host-bound traffic 19, discarding of host-bound traffic 19 in forwarding components 18 when congestion occurs in the host-bound path of control plane 8. Where congestion is not present, control plane 8 directs forwarding components 18 to eschew discard of host-bound traffic and instead forward all of the host-bound traffic on the host-bound path to control plane 8.

Upon identifying current or recent congestion, however, control plane 8 identifies individual or groups of network packet flows among the host-bound traffic using resources in excess of their respective fair shares of available resources of control plane 8 and configures forwarding components 18 using configuration message 15 to constrain a rate at which the identified network packet flows are permitted to flow toward control plane 8 on the host-bound path. When the congestion dissipates, control plane 8 detects the dissipation and reconfigures forwarding components 18 to remove the constraints applied to the identified network packet flows.

In some examples, control plane 8 detects congestion in the host-bound path. Upon detecting the congestion, control plane 8 identifies packet flows utilizing an excessive amount of host-bound path resources and computes limits for the identified packet flows based on available resources and a fair share for the identified packet that may be dependent, for instance, upon the protocol associated with the packet flow (e.g., BGP) and the number of packet flows associated with that particular protocol. Control plane 8 then programs one or more of forwarding components 10 to dynamically add or update policers configured with the computed limits for the identified packet flows. Forwarding components 18 subsequently apply the policers to the identified packet flows to constrain the amount of traffic of the packet flows allowed to reach control plane 8 to the computed limits. That is, forwarding components 18 rate-limit the forwarding of packets for the identified packet flows to control plane 8 in accordance with the specified limits for the corresponding flows, which may result in certain packets for the flows being discarded. As a result, control plane 8 may intelligently and dynamically prioritize discarding of host-bound traffic by forwarding components 18 of forwarding plane 10 during periods of congestion, while conserving work (i.e., eschewing packet discard) during periods of no congestion.

Figure 2:
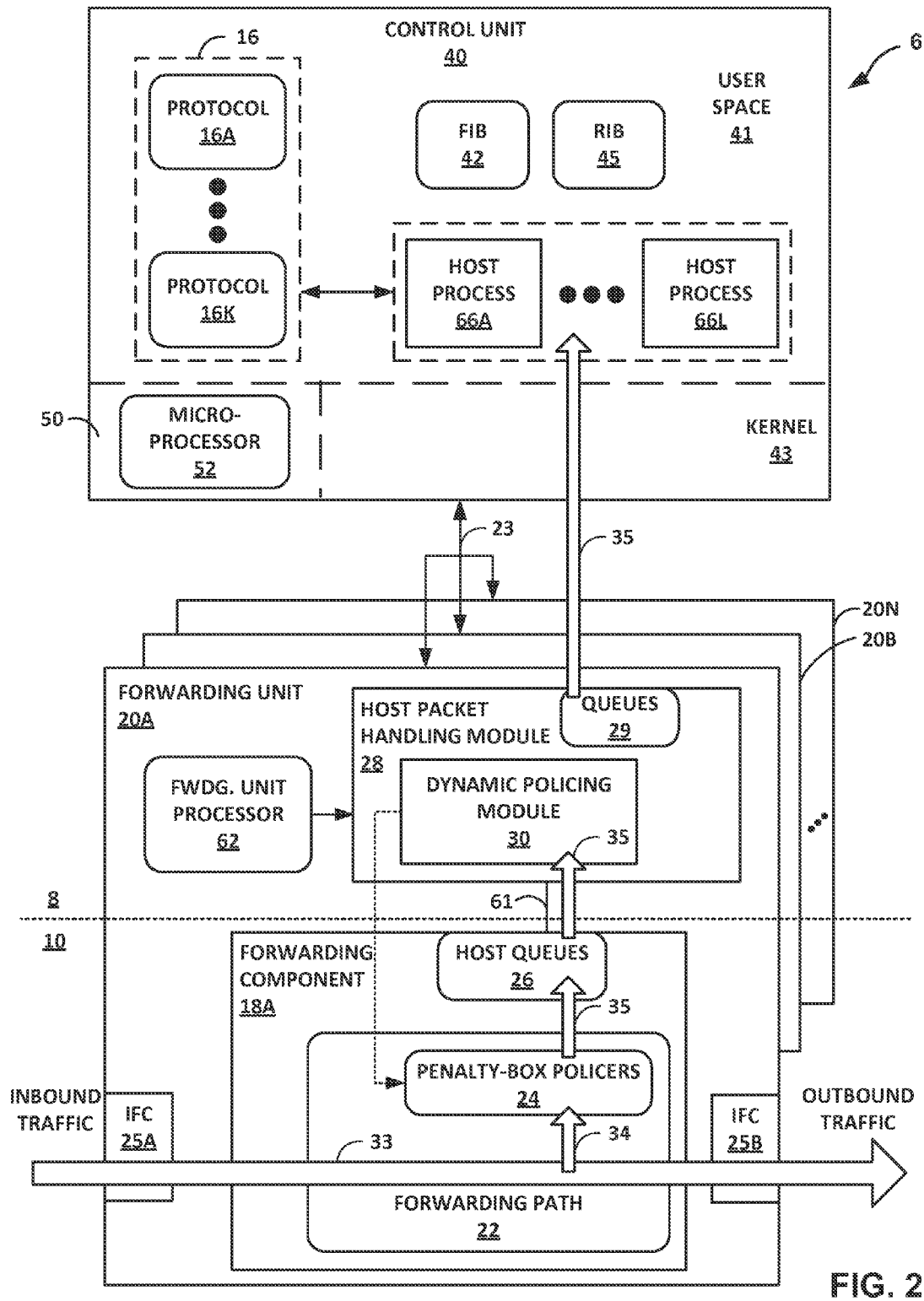
FIG. 2 is a block diagram illustrating, in detail, components of an example network device that dynamically respond to congestion by constraining network packet flow to computed limits, in accordance with techniques described in this disclosure.

FIG. 2 is a block diagram illustrating, in detail, components of an example network device that dynamically respond to congestion by constraining network packet flow to computed limits, in accordance with techniques described in this disclosure. Network device 6 illustrated in FIG. 2 may represent an example instance of network device 6 of FIG. 1.

In this example, control unit 40 includes a combination of hardware and software that provides a control plane 8 operating environment for execution of various user-level host processes 66A-66L (collectively, "host processes 66") executing in user space 41. By way of example, host processes 66 may include a command-line interface and/or graphical user interface process to receive and respond to administrative directives in accordance with one or more of protocols 16, a routing protocol module to execute one or more routing protocols of protocols 16, a network management process to execute one or more network management protocols of protocols 16, an ARP process to respond to ARP requests according the ARP protocol of protocols 16, a subscriber management process to manage subscriber session setup and maintenance in accordance with one or more subscriber session management protocols (e.g., GPRS Tunneling Protocol-C(ontrol)), and so forth. In this respect, control unit 40 may provide routing plane, service plane, and management plane functionality for network device 6.

Host processes 66 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which host processes 66 may interact with the underlying system. Hardware environment 50 of control unit 40 includes microprocessor 52 that executes program instructions loaded into a main memory (not shown in FIG. 2) from a storage device (also not shown in FIG. 2) in order to execute the software stack, including both kernel 43 and user space 41, of control unit 40. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of host processes 66 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42"). Typically, the routing protocol process generates FIB 42 in the form of a radix or other lookup tree to map packet information (e.g., header information having destination information and/or a label stack) to next hops and ultimately to interface ports of interface cards associated with respective forwarding units 20A-20N.

Network device 6 also includes a plurality of forwarding units 20A-20N (collectively, "forwarding units 20") and a switch fabric (not shown) that together provide a forwarding plane 10 for forwarding network traffic. Forwarding units 20 connect to control unit 40 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 2. Forwarding unit 20A receives and sends network packets via interfaces of interface cards (IFCs) 25A, 25B of forwarding unit 20A. Forwarding unit 20A also includes forwarding component 18A, which represents hardware or a combination of hardware and software that provide high-speed forwarding of network traffic. Likewise, forwarding unit 20B includes forwarding component 18B, and so on. In some examples, one or more of forwarding units 20 may each include multiple forwarding components substantially similar to forwarding component 18A. Example forwarding units include flexible programmable integrated circuit (PIC) concentrators (PFCs), dense port concentrators (DPCs), and modular port concentrators (MPCs). In some instances, forwarding units 20 are line cards.

Each of IFCs 25A, 25B may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of forwarding components 18 is associated with different IFCs of the forwarding unit on which the forwarding component is located. The switch fabric (again, not shown) connecting forwarding units 20 provides a high-speed interconnect for forwarding incoming transit network packets to the selected one of forwarding units 20 for output over a network interface.

Network device 6 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Forwarding units 20A-20N of network device 6 demarcate control plane 8 and forwarding plane 10 of network device 6. That is, forwarding unit 20A performs functions of both control plane 8 and forwarding plane 10. In general, forwarding component 18A and IFCs 25A, 25B implement forwarding plane 10 for forwarding unit 20A, while forwarding unit processor 62 (illustrated as "fwdg. unit processor 62") executes software including host packet handling module 28 that implement portions of control plane 8 within forwarding unit 20A. Control unit 40 also implements portions of control plane 8 of network device 6. Forwarding unit processor 62 of forwarding unit 20A manages forwarding component 18A and executes instructions to provide an interface to control unit 40 and handle host-bound or other local network packets (such as packets that include Options Field values or TTL-expired packets). Forwarding unit processor 62 may execute a microkernel for forwarding unit 20A.

Forwarding component 18A may include programmable ASIC-based packet processors that process network packets by performing a series of operations on each packet over respective internal packet forwarding paths as the packets traverse the internal architecture of network device 6. Forwarding component 18A includes forwarding structures that, when executed, examine the contents of each packet (or another packet property, e.g., incoming interface) and on that basis make forwarding decisions, apply filters, and/or perform accounting, management, traffic analysis, and load balancing, for example. In one example, each of forwarding components 18 arranges forwarding structures as next hop data that can be chained together as a series of "hops" along an internal packet forwarding path for the network device. The result of packet processing determines the manner in which a packet is forwarded or otherwise processed by forwarding components 18 from its input interface on one of forwarding units 20 to its output interface on one of forwarding units 20.

Forwarding component 18A identifies packet properties and perform actions bound to the properties. Forwarding component 18A executes microcode (or "microinstructions") to control and apply fixed hardware components of the ASICs to process packet "keys." A packet key includes packet fields and other parameters that determine a flow of packet processing for the packet along an internal forwarding path. Internal forwarding path 22 ("forwarding path 22") comprises programmable, executable microcode and fixed hardware components that determine the packet processing actions and other operations performed by forwarding component 18A. Forwarding path 22 may include, for example, executable instructions, programmable logic, and application-specific logic that perform lookups, rate limit packet flows (e.g., using policers), and manipulate packet keys, among other functions. Internal forwarding paths of network device 6 may include combinations of respective forwarding paths 22 of multiple different forwarding components 18A. In other words, forwarding path 22 of forwarding component 18A may include only a part of the overall internal forwarding path of network device 6. Control unit 40 programs forwarding path 22 of forwarding component 18A to identify host-bound network packets and forward such packets toward control unit 40. For example, control unit 40 may program filters that include a network address of a network device 6 and direct forwarding component 18A to forward network packets having a destination address that matches the network address toward control unit 40.

Forwarding unit 20A receives network traffic 33 by IFCs 25A, 25B, and forwarding component 18A processes network traffic 33 using internal forwarding path 22. Forwarding component 18A looks up outbound interfaces for and forwards transit network packets that are neither host-bound nor otherwise a response of logical decision by control plane 8 as outbound traffic via the outbound interfaces of IFCs 25A, 25B.

Forwarding component 18A applies internal forwarding path 22 to network traffic 33 to identify and forward host-bound network packets, collectively constituting host-bound traffic 34, toward control unit 40. Host-bound traffic 34 includes one or more network packet flows. As described in further detail below, forwarding component 18A may, during periods of congestion, apply penalty-box policers 24 to host-bound traffic 34 to discard network packets, resulting in policed host-bound traffic 35 toward the host (i.e., control unit 40). Each network packet flow includes one or more packets classified by forwarding path 22 as matching a set of one or more properties. Different packet flows may be classified using different properties and property values. For example, some packet flows may be identified as matching a standard 5-tuple (or subset thereof) consisting of transport layer protocol, source IP address, destination IP address, source port, destination port. Some packet flows may be further distinguished by incoming interface. Some packet flows may be characterized by, for a particular incoming interface, all ARP packets destined to a particular MAC address, all ARP broadcast packets from a particular MAC address, all OSPF hello messages, all packets received from a particular OSPF neighbor, and so forth. The above examples, at least, denote that packet flows may be distinguishable from one another by forwarding component 18A by protocol (e.g., LDP, ARP, OSPF, BGP, UDP, TCP, etc.), incoming interface, one or more of fields of the standard 5-tuple, and/or MPLS labels, for example.

Forwarding unit processor 62 executes host packet handling module 28, which manages transport of host-bound and other local packets to control unit 40. In this example, host notification queues 26 of forwarding component 18A enqueue metadata describing host-bound network packets stored by forwarding component 18A and awaiting transport to control unit 40 by host packet handling module 28. Bus 61 is a communication link that enables communication of network packet data and metadata and signaling messages between forwarding unit processor 62 and forwarding component 18A. Bus 61 may include a DMA bus and be controlled, at least in part, by a DMA chip for direct memory copying of stored packet data to computer-readable storage memory (not shown) controlled by forwarding unit processor 62 for analysis and/or to await transport to control unit 40 via communication links 23. In general, host packet handling module 28 dequeues metadata from host queues 26 to identify host-bound network packets stored by forwarding component 18A. Host packet handling module 28 uses the metadata to enqueue the metadata (or a representation thereof) for identified host-bound network packets to software queues 29. The host-bound path from forwarding component 18A refers to the interface from forwarding component 18A to host processes 66 of control unit 40 and may include, for example, software queues 29, as well as communication links 23 and host packet handling module 28. Host packet handling module 28 may use software queues 29 to implement classification and scheduling for packet flows for priority of service. Host packet handling module 28 may apply priority queuing, weighted round-robin, or weighted fair queuing, for example, when enqueuing/dequeuing packet metadata to software queues 29. Host packet handling module 28 dequeues packet metadata for transport to control unit, reads the corresponding packet data from a memory buffer of forwarding unit 20A, and forwards the network packets toward control unit 40 for processing.

In accordance with techniques described in this disclosure, dynamic policing module 30 of forwarding unit 20A analyzes host-bound traffic 35 to dynamically detect congestion, compute policer limits on a per-protocol group basis, identify network packet flows exceeding their fair share of host resources, and install penalty-box policers 24 to forwarding plane 10 to constrain a rate at which the identified network packet flows are permitted to flow toward control unit 40 from forwarding component 18A. Again, each of forwarding units 20 includes components substantially similar to those described with respect to forwarding unit 20A. Forwarding unit processor 62 executes dynamic policing module 30. Policing, in general, enables limiting the amount of traffic that passes into or out of an interface. Policing applies two types of rate limits on the traffic: (1) bandwidth (e.g., average bits/s) and (2) maximum burst size permitted for bursts of data that exceed the given bandwidth limit. Here, the interface being policed includes the host-bound path from forwarding component 18A to control plane 8 portions of forwarding unit 20A. Accordingly, each of penalty-box policers 24 of forwarding component 18A matches one or more packet flows to constrain a rate at which packet data for the packet flows may pass undiscarded. Because the resource constraint involves the host-bound path, dynamic policing module 30 installs penalty-box policers 24 to forwarding component 18A to manage excess traffic in forwarding component 18A before such traffic consumes resources needed to reach forwarding unit processor 26. In this way, traffic discarding occurs before the host notification queues 26 because the interface from host notification queues 26 to forwarding unit processor 26 is one of the bottleneck resources to be protected. In some instances, one or more of penalty-box policers 24 apply a rate limit according to a metric other than bandwidth that is configured by dynamic policing module 30. One example such metric is packets per second.

Dynamic policing module 30 monitors software queues 29 and/or host notification queues 26 toward control unit 40 to periodically detect congestion. For example, dynamic policing module 30 may periodically determine a sum of the lengths of one or more software queues 29 exceeds a configured high watermark, which indicates the host-bound traffic is exceeding a rate at which control unit 40 can retrieve and process the host-bound traffic and, therefore, the host-bound path is congested. As another example, dynamic policing module 30 may determine a sum of the lengths of one or more software queues 29 exceeds a configured high watermark, which may also indicate congestion by to-host traffic. Lengths of software queues 29 typically depends upon a number of factors, including speed of host processes 66, communication links 23 bandwidth, backpressure applied to software queues 29 by components of control unit 40, and rates of inbound packet flows.

Control unit 40 executes multiple protocols 16, each making different demands upon system resources according to protocol complexity, number of protocol peers, and so forth. Dynamic policing module 30 consolidates protocols 16 into protocol groups each including of one or more of protocols 16. For example, dynamic policing module 30 may consider ICMP and ICMPv6 a single protocol group, despite these being distinct (though similar) protocols. A "protocol group," as used herein, refers to a set of host-bound packet flows that should be considered and managed as a set. Protocols 16 may be grouped administratively by configuring forwarding unit 20A with configuration data. An example consideration of whether to group two or more of protocols 16 in a protocol group is similarity in traffic load. Each protocol group may be associated with one or more packet flows. As used herein, a "packet" may refer to IP packets, other layer three (L3) protocol packet data units (PDUs), and to layer two (L2) packet data units (e.g., Ethernet datagrams or Asynchronous Transfer Mode cells). Accordingly, a "packet flow" may refer to one or more IP packets, one or more other L3 protocol PDUs, or one more L2 PDUs.

Upon detecting congestion, dynamic policing module 30 determines, for each of the protocol groups, whether network flows associated with the protocol group exceeds a share of resources allocated for the protocol group. If so, the protocol group is considered "greedy," and dynamic policing module 30 computes a dynamic limit for the protocol group and applies the computed limit to existing penalty-box policers 24 to constrain packet flows of the protocol group. During congestion, dynamic policing module 30 computes dynamic limits for each of the protocol groups. For some protocol groups, dynamic policing module 30 computes respective dynamic limits for individual flows of the protocol group. Again, these tasks of identifying congestion, determining whether a protocol group is greedy, and computing policer limits and updated existing penalty-box policers 24 may be executed periodically (i.e., not traffic-driven).

When dynamic policing module 30 considers a protocol group greedy and has computed a limit for the protocol group, incoming packets of host-bound traffic 35 determine whether dynamic policing module 30 then adds a penalty-box policer for the associated packet flow (and by extension, protocol group) to penalty-box policers 24. As forwarding component 18A receives packets associated with a greedy protocol group (or greedy packet flow of the greedy protocol group), dynamic policing module 30 determines whether the number of received packets and/or associated bandwidth exceeds the limit. If so, and if the greedy protocol group (or packet flow of the greedy protocol group) does not already have an associated policer in penalty-box policers 24, then dynamic policing module 30 adds a new policer to penalty-box policers 24 and configures the new policer with the computed limit for the greedy protocol group. Forwarding component 18A applies penalty-box policers 24 to host-bound traffic 34 to constrain the amount of network packet data of the packet flows allowed to reach control plane 8 by discarding packets that exceed the configured limits of penalty-box policers 24, resulting in policed host-bound traffic 35.

In this way, dynamic policing module 30 may restrict traffic in a work-conserving manner, mitigate congestion, and improve fair sharing among protocols 16. The tasks of congestion detection, computation of per-protocol group policer limits, detection of greedy flows, and installation of policers to penalty-box policers 24 require time. As a result, dynamic policing module 30 may not be instantly responsive to congest, but rather reacts within 1-2 seconds in some examples.

Figure 3:
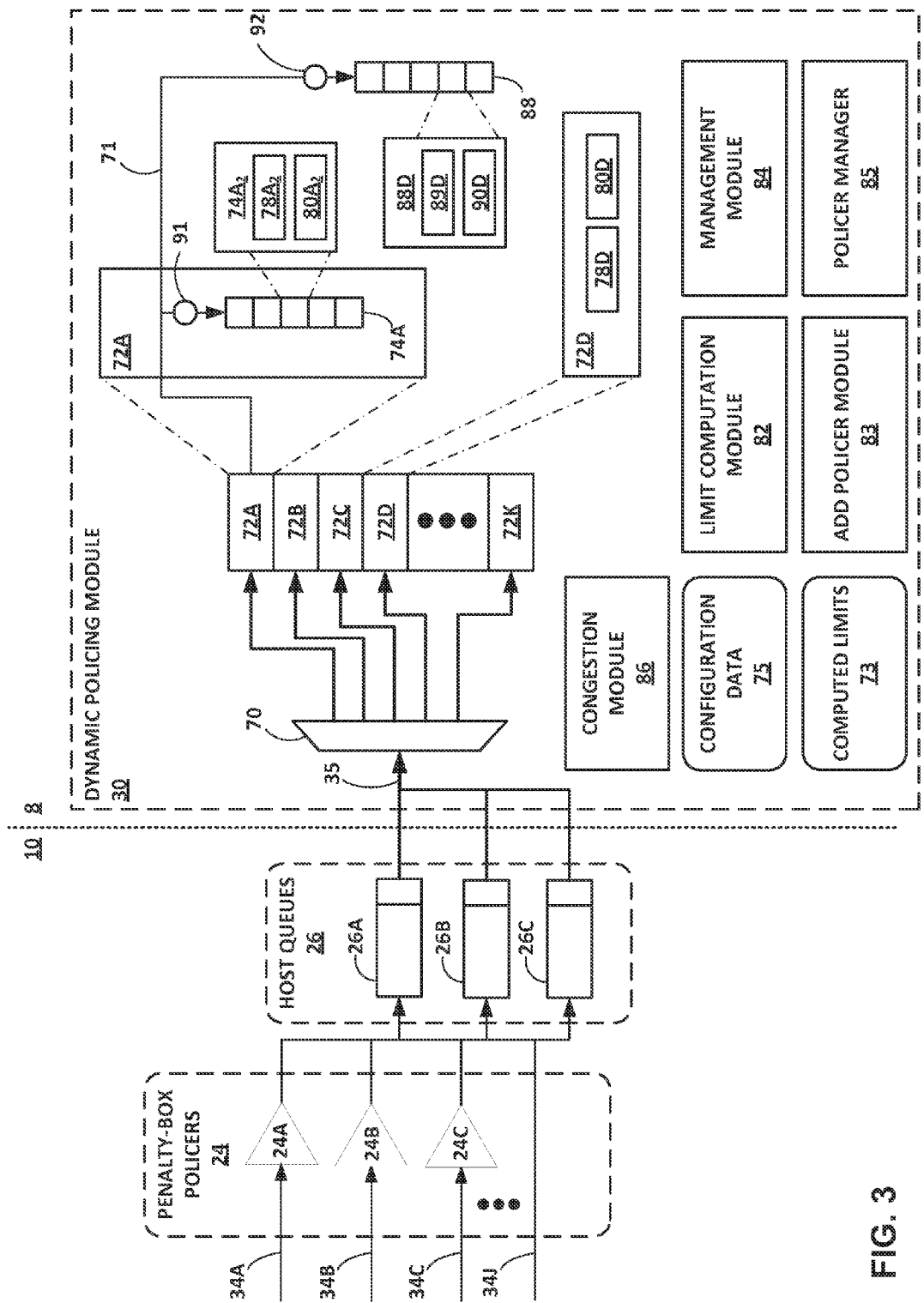
FIG. 3 is a block diagram illustrating, in detail, example components of a network device to monitor network packet flows and compute packet flow limits in accordance with dynamic policing techniques described in this disclosure.

FIG. 3 is a block diagram illustrating, in detail, example components of a network device to monitor network packet flows and compute packet flow limits in accordance with dynamic policing techniques described in this disclosure. In this example instance of network device 6, host queues 26 include lookup-to-host queue 26A, Options queue 26B, and TTL-expired queue 26C. Host queues 26 receive host-bound traffic 35 (including one or more host-bound packets) from forwarding component 18A, which applies penalty-box policers 24 to host-bound traffic 34 received by IFCs 25A, 25B. Each of penalty-box policers 24A-24C applies to corresponding network packet flows 34A-34C. Forwarding component 18A in the illustrated case does not apply penalty-box policers 24 to additional packet flows 34D-34J. Varying circumstances of incoming packet flows may dictate, in accordance with the described techniques, varying numbers of penalty-box policers. In some circumstances (as when there is no congestion), penalty-box policers 24 may include zero policers and "policed" host-bound traffic 35 may be substantively identical to host-bound traffic 34.

Dynamic policing module 30 includes configuration data 75 that consolidates packet flows associated with protocols 16A-16K into protocol groups 72A-72K (collectively, "protocol groups 72"), each defined above as a set of host-bound packet flows that should be considered and managed as a set. Configuration data 75 may represent an associative data structure, such as a database, table, or list, which associates protocol groups 72 with various properties described herein.

Configuration data 75 also associates, with each of protocol groups 72, one of three categories of fairness that determines a level of granularity of analysis with respect the protocol group. The three categories, in this example, are "per-session fairness," "per-protocol fairness," and "damage control." Some of protocol groups 72 require per-session fairness that distinguishes among different sessions, neighbors/peers, and/or packet flows. For example, multiple OSPF sessions each requires an adequate amount of control plane 8 resources to remain active. An OSPF protocol group of protocol groups 72 therefore requires per-session fairness.

Some of protocol groups 72 require per-protocol fairness that does not distinguish among different protocol sessions or packet flows. Rather, the protocol group as a whole requires a guaranteed resource share. Finally, some of protocol groups 72 do not necessarily require a given share of resources. These are categorized as damage control. Dynamic policing module 30 prevents damage control ones of protocol groups 72 from utilizing excessive resources and negatively impacting those protocol groups 72 that are categorized as per-session or per-protocol fairness. Table 1, below, provides an example list of protocol groups 72 as may be defined by configuration data 75.

ration data 75 to policed host-bound traffic 35 to assign network packets of the one or more host-bound packet flows that constitute policed host-bound traffic 35 to one of protocol groups 72. For example, protocol group 72A may represent an ARP protocol group that includes all packet flows that carry ARP traffic (e.g., having Ethernet Frame Type 2054). As another example, protocol group 72B may represent an OSPF protocol group that includes all network packet flows that carry OSPF traffic (e.g., IP packets having IP protocol 89).

Dynamic policing module 30 performs some tasks periodically (e.g., once per second). These include identifying

TABLE 1

Protocol groups

| Protocol Group Name | Identifying Features | Category | Hashing Requirements |
|---|---|---|---|
| Raw Packets | Packets that are not IP, ISIS, ARP, or LACP | Damage Control | None |
| ARP | Non-IP packet, Ethernet Frame Type is 2054 | Per-Session Fairness | Incoming Interface, source MAC address |
| BGP | TCP packets, TCP port is 179 | Per-Session Fairness | Incoming Interface, source IP address, source port, destination IP address, destination port |
| OSPF | IP packet, IP protocol is 89 | Per-Session Fairness | Incoming Interface, source IP address |
| ISIS | ISO packet, on Ethernet, IEEE 802.3 DSAP = 0xFE and 802.3 SSAP = 0xFE | Per-Session Fairness | Incoming Interface, [source MAC Address if Ethernet frame] |
| LDP | TCP port 646 and UDP port 646 | Per-Session Fairness | Incoming Interface, source IP address, source port, IP protocol, destination IP address, destination port |
| RSVP | IP packet, IP protocol is 46 | Per-Session Fairness | Incoming Interface, source IP address. Destination IP address in some instances. |
| PIM | IP packet, IP protocol is 103, PIM Message Type not 0 or 1 | Per-Session Fairness | Incoming Interface |
| PIM Hellos | IP packet, IP protocol 103, PIM Message Type 0 | Per-Protocol Fairness | None |
| PIM Register | IP packet, IP protocol 103, PIM Message Type 1 | Per-Protocol Fairness | None |
| Mismatch & Resolve Notifications | Hardware generated - need to determine format. | Per-Protocol Fairness | None |
| LACP | Ethernet Frame, subtype = 0x1, destination MAC Address is Slow_Protocols_Multicast address of 01-80-C2-00-00-02 | Per-Session Fairness | Incoming Interface, source MAC address |
| IGMP, MLD | IGMP has IP protocol is 2 MLD has Next Header of 58 | Per-Session Fairness | Incoming Interface |
| BFD | 3784/tcp, 3784/udp, 3785/tcp, 3785/udp, May be under MPLS labels | Per-Session Fairness | Incoming Interface, MPLS labels, source IP address, source port, IP protocol, destination IP address, destination port |
| SSH, SFTP, FTP, Telnet | 20/tcp, 20/udp, 22/tcp, 22/udp, 21/tcp, 21/udp, 23/tcp, 23/udp | Per-Protocol Fairness | None |
| SNMP | 161/tcp, 161/udp, 162/tcp, 162/udp | Per-Protocol Fairness | None |
| ICMP, ICMPv6 | ICMP has IP protocol of 1 or TTL = 1 (IP or MPLS) | Per-Protocol Fairness | None |
| Default IP | Other IP traffic not matching another protocol group. | Damage Control | None |
| Default MPLS | Other MPLS traffic not matching another protocol group. | Damage Control | None |

Configuration data 75 associates each of protocol groups 72 with identifying features (column "Identifying Features" of Table 1). Using the identifying features, classification module 70 of dynamic policing module 30 applies configucongestion per protocol group, determining whether a protocol group is greedy, computing per-protocol group policer limits and updating existing policers, and removing policers when appropriate. Each of protocol groups 72 is associated with counters. In this example, protocol groups 72 categorized as per-protocol fairness or damage control are each associated with respective packets received counters 78A-78K (collectively, "packets received counters 78") and with respective bytes received counters 80A-80K (collectively, "bytes received counters 80"). As one example, protocol group 72D is illustrated in exploded view in FIG. 3 as being associated with packets received counter 78D and bytes received counters 80D. Protocol group 72A is categorized in this example as a per-protocol fairness protocol group.

Packet received counters 78 count the number of packets received from forwarding component 18A during a period for the corresponding one of protocol groups 72 (per-protocol fairness or damage control) or the corresponding hash bucket (per-session fairness, with hash buckets being described below). Bytes received counters 80 count the number of bytes received from forwarding component 18A during a period for the corresponding one of protocol groups 72 or the corresponding hash bucket. In some instances, forwarding unit 20A that includes dynamic policing module 30 may include multiple forwarding components similar to forwarding component 18A. In such instances, dynamic policing module 30 may include copies of each of counters 78, 80, 89, and 90 described herein for each of the forwarding components. In this way, dynamic policing module 30 may dynamically compute policer limits, update existing policers, and remove policers on a per-forwarding component basis.

Protocol groups 72 categorized as per-session fairness use one or more tables with table entries, or another associative data structure, to allow flow identification and store statistics for identified flows using packets received counters and bytes received counters for each table entry. In some examples (including the illustrated example), protocol groups 72 categorized as per-session fairness use hash tables with hash buckets to allow flow identification and store statistics for identified flows, hashed to the hash buckets, using packets received counters and bytes received counters for each hash bucket. Using hash tables may ensure the incoming packets from multiple different sources for one of protocol groups 72 does not over-utilize or starve memory or other resources of forwarding unit 20A. That is, using hash buckets to identify flows enables identification of greedy flows without devoting excessive amounts of resources to non-greedy flows. In addition, using hash buckets may allow application of the described techniques without a priori knowledge of expected or legitimate flows. Rather, the described techniques may protect even against unexpected incoming flows, including those that represent malicious attacks.

As one example, protocol group 72A is illustrated in exploded view in FIG. 3 as being associated with hash table 74A and common collision hash table 88. Protocol group 72A is categorized in this example as a per-session fairness protocol group. Protocol group hash table 74A is a per-protocol hash table for protocol group 72A and stores statistics for packet flows for protocol sessions of protocol group 72A protocols. Each of protocol groups 72 that is categorized as per-session fairness is associated with one of protocol group hash tables 74A-74K (collectively, "protocol group hash tables 74"). Protocol group hash table 74A includes hash buckets $74A_1$-$74A_J$ that is each associated with a corresponding one or packets received counters $78A_1$-$78A_J$ and bytes received counters $80A_1$-$80A_J$. For example, hash bucket $74A_2$ is associated with packet received counter $78A_2$ and bytes received counters $80A_2$. Configuration data 75 may include configuration data specifying a size of protocol group hash tables 74, which may depend on a maximum number of expected flows. Dynamic policing module 30 uses hash function 91 to compute a hash and determine a hash bucket in protocol group hash tables 74 for incoming packets of packet flows. For example, hash function 91 applied to received packet 71 associated with protocol group 72A may hash received packet 71 to hash bucket $74A_2$. As a result, dynamic policing module 30 increments packets received counter $78A_2$ by one and increments bytes received counter $80A_2$ by a number of bytes of received packet 71. At the start of each period, dynamic policing module 30 clears each of received packet counters 78 and received byte counters 80.

Dynamic policing module 30 in this example also includes common collision hash table 88 ("collision hash table 88") to reduce a probability of identifying a network packet flow as greedy because the network flow shares a hash bucket in one of protocol group hash tables 74 with a greedy network flow. Collision hash table 88 aids in resolving collisions and uses hash function 92 that is independent from hash function 91. Collision hash table 88 includes collision hash buckets 88A-88L each associated with a corresponding one of packets received counters 89A-89L and a corresponding one of bytes received counters 90A-90L. All network flows for protocol groups 72 categorized as per-session fairness are associated with collision table 88. That is, dynamic policing module 30 may hash network flows corresponding to different ones of protocol groups 72 to a single hash bucket of collision hash table 88. Dynamic policing module 30 uses hash function 92 to compute a hash and determine a hash bucket in collision hash table 88 for incoming packets of packet flows. For example, hash function 92 applied to received packet 71 may hash received packet 71 to hash bucket 88D. As a result, dynamic policing module 30 increments packets received counter 89D by one and increments bytes received counter 90D by a number of bytes of received packet 71. At the start of each period, dynamic policing module 30 clears each of received packet counters 89 and received byte counters 90.

Input to hash functions 91, 92 varies according to each of protocol groups 72 characterized as per-session fairness. Hash function inputs are listed, for various protocol groups, in Table 1 ("Hashing Requirements"). For example, Table 1 specifies an OSPF protocol group of protocol groups 72 as having Incoming interface and source IP address as inputs to hash functions 91, 92. In addition, in some examples, a current period counter is added to inputs to hash functions 91, 92 to seed the hash functions and ensure that dynamic policing module 30 hashes flows to different hash buckets of protocol group hash tables 74 from period to period. As a result, the same network flows do not share the same hash bucket in protocol group hash tables 74 each period. The current period counter may be initialized to a random number and incremented at the beginning of each period. Hash functions 91, 92 may each represent an instance of SHA-1, MD5, or another hash function.

In some instances, dynamic policing module 30 stores an indication of whether one or multiple packet flows have been received during a period. Dynamic policing module 30 in such instances may store a "first collision hash seen" bit and then set a "multiple flows" bit if an incoming packet does not have the collision hash and the multiple flows bit is clear. Dynamic policing module 30 clears the first collision hash seen bit and the multiple flows bit at the start of every period. Dynamic policing module 30 may use the first collision hash seen bit and the multiple flows bit to more quickly restrict greedy flows to the correct level when computing dynamic limits in accordance with the described techniques.

As noted above, dynamic policing module 30 identifies congestion, determines whether a protocol group is greedy, computes per-protocol group policer limits, updates existing policers, and removes existing policers on a periodic basis. Congestion module 86 of dynamic policing module 30 periodically monitors software queues 29 and/or host notification queues 26 to detect congestion. For example, congestion module 86 may periodically determine a sum of the lengths of one or more queues 29 exceeds a high watermark configured in configuration data 75. As another example, dynamic policing module 30 may also, or alternatively, determine a sum of the lengths of one or more queues 29 exceeds a high watermark configured in configuration data 75, which may also indicate congestion by to-host traffic.

Limit computation module 82 of dynamic policing module 30 periodically determines whether each of protocol groups 72 is exceeding its fair share allocated in configuration data 75. Some protocol groups 72 generally require more resources than others. Accordingly, an administrator or other entity may associated, in configuration data 75, each of protocol groups 72 with a "goal weight" that represents a fair share amount of resources that may be consumed by the protocol group during congestion. If the current ratio or "current weight" of network traffic associated with one or protocol groups 72 exceeds its goal weight, then limit computation module 82 identifies the protocol group as greedy.

For each of protocol groups 72, at the end of a period in which either (1) congestion module 86 identifies congestion and limit computation module 82 the protocol group as greedy; or (2) an existing one or more of penalty-box policers 24 are associated with a packet flow of the protocol group, then limit computation module 82 computes new limits for one or more of penalty-box policers 24. Limit computation module 82 may store the computed limits to computed limits 73 and/or provide computed limits to policer manager 85 to update existing policers 24 with the new computed limits.

Limit computation module 82 computes the new packet limits according to the goal weight for the corresponding one of protocol groups 72 and, at least for per-session fairness protocol groups, a distribution of packets counted in respective hash buckets of corresponding hash tables 74A-74K for the protocol groups. In other words, for one of hash tables 74 that includes multiple hash buckets each associated with one or more flows, limit computation module 82 computes packet limits for the flows according to a distribution of the number of packets among the hash buckets. In this way, limit computation module 82 computes limits for greedy flows that, when applied by penalty-box policers 24, reduces consumption by the greedy flows such that the total traffic associated with the protocol group is less than or equal to a goal traffic for the protocol group. "Goal traffic" for a group protocol represents a number of packets to which the group protocol should be limited for a period, based upon the goal weight for the protocol and a current percentage of packets, among all packets received by forwarding component 18A, that are associated with the group protocol. For per-protocol fairness and damage control protocol groups of protocol groups 72, limit computation module 82 computes a packet limit for the protocol group as equal to the goal traffic for the protocol group.

Policer manager 85 periodically updates penalty-box policers 24 with computed limits 73 and, when appropriate, removes one or more of penalty-box policers 24. Because control unit 40 and forwarding unit 20A allocate host-bound path resources by packets, limit computation module 82 may compute goal traffic and current traffic in numbers of packets and transform these quantities to numbers of bytes for computed limits 73 (which includes packet limits and byte limits) and for penalty-box policers 24. Once limit computation module 82 has computed packet limits and byte limits of computed limits 73, policer manger 85 uses the period length to convert the byte limits to bandwidth limits for penalty-box policers 24. Limit computation module 82 may compute an average packet length, in bytes, for protocols groups 72 during a previous period using respective packets received counters 78 and bytes received counters 80. In some instances, limit computation module 82 uses a minimum average packet length over a previous N periods to mitigate attacks in which an attacker attempts to bias an average packet length high in one period to enable the attacker to send an excessive number of short packets in a subsequent period. In some instances, N=10. Limit computation module 82 may then use computed packet limits of computed limits 73 and the average packet length in bytes to compute byte limits for computed limits 73 for protocol groups 72.

Policer manager 85 additionally removes penalty-box policers 24 for policed network flows of policed host-bound traffic 35 that are no longer greedy or otherwise do not require policing. This has the effect of freeing policers of forwarding component 18A, a limited resource, for future use in policing other network flows of host-bound traffic 34.

Dynamic policing module 30 performs some tasks that are packet-driven, i.e., performed upon receipt of a packet from forwarding component 18A and based upon the properties of the received packet. These tasks include packet classification, packet counting, and adding penalty-box policers to penalty-box policers 24 based upon current system congestion and imbalances among protocol groups 72.

As described above, packet classification module 70 classifies packets of policed host-bound traffic 35 to one of protocol groups 72 according to identifying features of the packets. For per-protocol fairness and damage control protocol groups 72, dynamic policing module 30 increments packets received counters 78 and bytes received counters 80 for protocol groups 72 to which the incoming packets have been classified. For per-session fairness protocol groups 72, dynamic policing module 30 applies hash functions 91, 92 to hash incoming packets to hash buckets of hash tables 74 and to collision hash buckets 88A-88L of collision hash table 88. Dynamic policing module 30 increments packets received counters 78 and bytes received counters of hash buckets of hash tables 74 for packets hashed to the hash buckets, and dynamic policing module 30 also increments packets received counters 89 and bytes received counter 90 of collision hash buckets 88A-88L of collision hash table 88 for packets hashed to collision hash buckets 88A-88L.

Upon dynamic policing module 30 incrementing counters 78, 80, 89, and/or 90 due to a processed packet, add policer module 83 determines whether computed limits 73 for protocol groups 72, as computed by limit computation module 82, are violated by the counter increases. For per-protocol fairness and damage control protocol groups 72, add policer module 83 may add a penalty-box policer for a protocol group if (1) the corresponding packets received counter 78 meets or exceeds the packet limit of computed limits 73 for the protocol group, or (2) corresponding bytes received counter 80 meets or exceeds the byte limit of computed limits 73 for the protocol group. For per-protocol fairness protocol groups 72, add policer module 30 may add a penalty-box policer for a protocol group if (1) the corresponding packets received counter 78 for a hash bucket meets or exceeds the packet limit of computed limits 73 for the protocol group and the corresponding packet received counter 89 for the collision hash bucket 88 meets or exceeds the packet limit of computed limits 73 for the protocol group, or if (2) corresponding bytes received counter 80 for the hash bucket meets or exceeds the byte limit of computed limits 73 for the protocol group and corresponding bytes received counter 90 for the collision hash bucket 88 meets or exceeds the byte limit of computed limits 73 for the protocol group. Add policer module 83 configures the penalty-box policer to be added to penalty-box policers 24 of forwarding component 18A for the greedy packet flow(s) with a bandwidth limit translated from the byte limit and the period length.

Management module 84 provides an interface to a management interface of control unit 40, such as a command-line, graphical user, or network management interface, by which an administrator or other entity may configure and receive logs or other information regarding operations of dynamic policing module 30. Management module 84 may expose the following configuration parameters of configuration data 75:

TABLE 2

Configuration parameters

| Configuration Capability | Scope | Meaning and Usage |
| --- | --- | --- |
| Goal Fair Share | Protocol group | The goal weight (e.g., 0.01 to 100) of the protocol group. Controls when dynamic policing module 30 considers the protocol group greedy. |
| Maximum limit | Protocol group | Maximum limit (in packets per second) usable for penalty-box policers 24. |
| Minimum limit | Protocol group | Minimum limit (in packets per second) usable for penalty-box policers 24. |
| Burst | Protocol group, interface | Burst size to use for penalty-box policers 24. This parameter may also be set per-interface for a protocol group. |
| Maximum penalty-box policers | Protocol group and for all protocol groups. | Number of penalty-box policers available per-protocol group and for all protocol groups, for each of forwarding units 20. |
| Enable Dynamic Policing of Host-Bound Traffic | Forwarding unit and system | Dynamic policing of host-bound may be enabled or disabled per line-card as well as for the whole system. |

An administrator or other entity may set any of the above configuration parameters to control the operations dynamic policing module 30. In addition, management module 84 may collect information to provide to control unit 40. Such information may include, for instance, for a given one or more of protocol groups 72:

Total traffic received in packets and bytes
Count of non-zero hash buckets (for approximating a number of flows)
Percentage of traffic from this protocol group
Penalty-box policer information
Number added last period
Number removed last period
Current number of penalty-box policers installed
Current number of penalty-box policers consolidated (e.g. not just one flow for per-session fairness protocol groups)
Identification of each flow restricted, when the corresponding penalty-box policer was installed, and current limit.
Packet discard for each penalty-box policer
Last N computed limits (in some examples, N=20).

In some examples, management module 84 may log or notify control unit 40 when a maximum number of penalty-box policers 24 for a protocol group is reached, when a first packet flow for a protocol group is policed no more than once per X minutes, and when policer manager 85 removes a penalty-box policer 24 from a last network flow monitored by dynamic policing module 30 (or per protocol group 72) (in some cases, notify of removal at a limited frequency). In some examples, management module 84 may provide to control unit 40 summary information regarding all penalty-box policers 24 on any forwarding components 18 monitored by dynamic policing module 30. Management module 84 may provide summary updates at a particular frequency.

Figure 4:
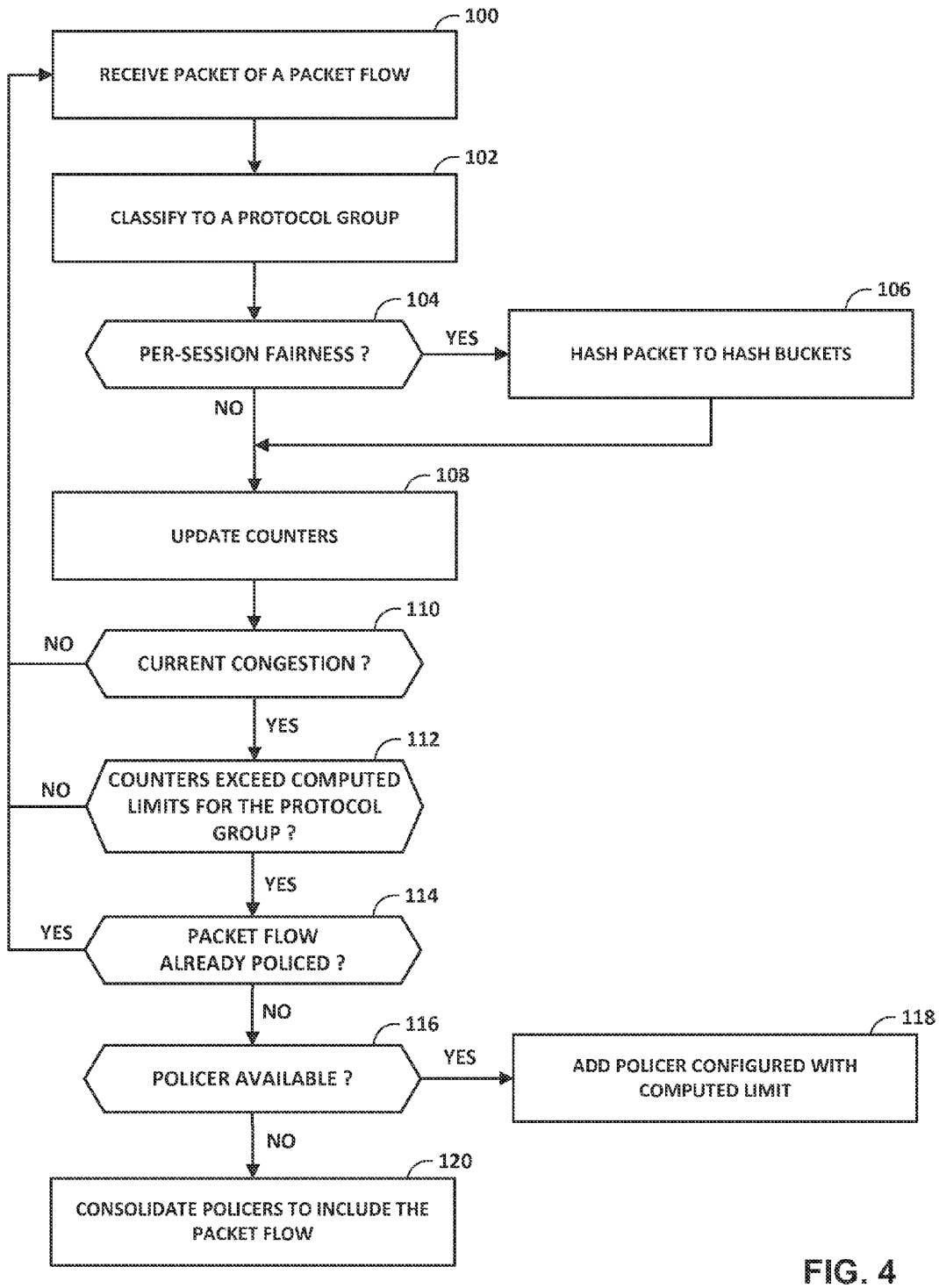
FIG. 4 is a flowchart illustrating an example mode of operation of forwarding unit components for adding a penalty-box policer upon packet receipt in accordance with techniques described in this disclosure.

FIG. 4 is a flowchart illustrating an example mode of operation of forwarding unit components for adding a penalty-box policer upon packet receipt in accordance with techniques described in this disclosure. The example mode of operation is described with respect to forwarding unit components illustrated in FIGS. 2-3. Dynamic policing module 30 executed by forwarding unit processor 62 of forwarding unit 20A dequeues packet metadata from one or host queues 26 and receives the corresponding packet from a forwarding component 18A packet buffer (100). Classification module 70 classifies the packet to one of protocol groups 72, each of which may be configured in configuration data 75 as associated with identifying features for application by classification module 70 (102). If the protocol group of protocol groups 72 to which classification module 70 classified the packet is characterized as a per-session fairness protocol group (YES branch of 104), dynamic policing module 30 applies hash functions 91, 92 to hash the packet to a hash bucket of the corresponding one of protocol group hash tables 74 and to a collision hash bucket of collision hash table 88 (106).

Dynamic policing module 30 increments the corresponding counters (108). If the packet is classified to a per-session fairness protocol group, dynamic policing module 30 increments the corresponding received packets counter 78 and the corresponding received bytes counter 80 of the hash bucket of protocol group hash table 74. Dynamic policing module 30 also increments the corresponding received packets counter 89 and the corresponding received bytes counter 90 of the collision hash bucket of collision hash table 88. For example, for received packet 71 hashed by hash function 91 to hash bucket 74A$_2$ of protocol group hash table 74A and hashed by hash function 92 to collision hash bucket 88D of collision hash table 88, dynamic policing module 30 increments received packet counter 78A$_2$, received bytes counter 80A$_2$, received packet counter 89D, and received bytes counter 90D.

If, as determined by congestion module 86, the host-bound path is not currently congested (NO branch of 110), dynamic policing module 30 does not modify the penalty-box policers 24 configuration. If the host-bound path is experiencing congestion (YES branch of 110), add policer module 83 determines whether the protocol group requires policing (i.e., exceeding its fair share of host-bound path resources) by determining whether the counters for the protocol group or protocol group hash bucket exceed the computed limits (112). If the protocol group is characterized as per-protocol fairness or damage control, add policer module 83 determines the protocol group has violated computed limits and requires policing when the corresponding packets received counter 78 meets or exceeds the packet limit for the protocol group in computed limits 73 and when the corresponding bytes received counter 80 meets or exceeds the byte limit for the protocol group in computed limits 73. For example, for a received packet classified to protocol group 72D, if (1) packets received counter 78D meets or exceeds the packet limit for protocol group 72D, or (2) bytes received counter 80D meets or exceeds the byte limit for protocol group 72D, then add policer module 83 determines protocol group 72D has violated computed limits and requires policing (YES branch of 112). If the protocol group is characterized as per-session fairness, add policer module 83 determines whether (1) the corresponding packets received counter 78 for the hash bucket meets or exceeds the packet limit of computed limits 73 for the protocol group and the corresponding packets received counter 89 for the collision hash bucket 88 meets or exceeds the packet limit of computed limits 73 for the protocol group, or if (2) corresponding bytes received counter 80 for the hash bucket meets or exceeds the byte limit of computed limits 73 for the protocol group and corresponding bytes received counter 90 for the collision hash bucket 88 meets or exceeds the byte limit of computed limits 73 for the protocol group. If so, the protocol group has violated computed limits and requires policing (YES branch of 112). For example, for a received packet classified to protocol group 72A, hashed by hash function 91 to protocol group hash bucket 74A$_2$, and hashed by hash function 92 to collision hash bucket 88D, add policer module 83 determines the protocol group has violated computed limits and requires policing when (1) packets received counter 78A$_2$ meets or exceeds the packet limit for protocol group 72A and packets received counter 89D also meets or exceeds the packet limit for protocol group 72A, or (2) when bytes received counter 80A$_2$ meets or exceeds the packet limit for protocol group 72A and also bytes received counter 90D also meets or exceeds the byte limit for protocol group 72A.

If the protocol group has not violated computed limits (NO branch of 112), dynamic policing module 30 does not modify the penalty-box policers 24 configuration. If the protocol group has violated computed limits (YES branch of 112), add policer module 83 determines whether a penalty-box policer 24 is already in place for the packet flow (114). If so, dynamic policing module 30 does not modify the penalty-box policers 24 configuration. If, however, the packet flow is not already policed in forwarding component 18A (NO branch of 114), add policer module 83 either adds to or consolidates penalty-box policers 24 to include a policer for the packet flow of the received packet (YES branch of 114).

If an unused policer in forwarding component 18A is available for use as a penalty-box policer (YES branch of 116), add policer module 83 configures the unused policer to match the packet flow for the received packet and set the bandwidth limit according to the byte limit and period length for determining packets received and bytes received by dynamic policing module 30 (118). If no policers are unavailable for use as a penalty-box policer (NO branch of 116), add policer module 83 consolidates existing policers such that a consolidated policer matches (or frees another policer to match) the packet flow for the received packet (120). Add policer module 83 configures the consolidated or newly freed policer to set the bandwidth limit according to the byte limit and period length for determining packets received and bytes received by dynamic policing module 30.

In some instances, add policer module 83 consolidates existing policers when no free policers are available due to resource limitations or policy restrictions. If there are multiple packet flows from a common source, add policer module 83 may merge the matching characteristics of the flows to an interface- or source-specific policer that is limited to the common protocol group, ports, or other commonalities identifying the packet flows as part of the protocol group. If add policer module 83 finds no group of penalty-box policers 24 with matching criteria for a same source, add policer module 83 may attempt to merge policers based on other common fields. Merging depends on the protocol groups and its manner of definition in configuration data 75. Limits used for a merged policer depend upon the number of packet flows expected to match it. Add policer module 83 computed the limits when merging one or more policers matching multiple flows to a single merged policer. In some cases, add policer module 83 may configures a per-interface protocol group penalty-box policer. In such cases, add policer module 83 may be the bandwidth limit for the policer on the known number of policed flows and the computed limit per flow.

An example consolidation for a BGP protocol group (having identifying features of incoming interface, source IP address, destination IP address, source port, and destination port per Table 1, above) is as follows: add policer module 83 consolidates multiple penalty-box policer on ports while requiring that either the source port or the destination port is BGP. Incoming interface, source IP address, destination IP address, and IP protocol are matched to the merged policer. For further consolidation, add policer module 83 may drop destination IP address as a matching criterion for the merged policer. For still further consolidation, add policer module 83 may match all BGP traffic on the incoming interface to merge multiple policers configured to match multiple BGP packet flows on the incoming interface.

Figure 5:
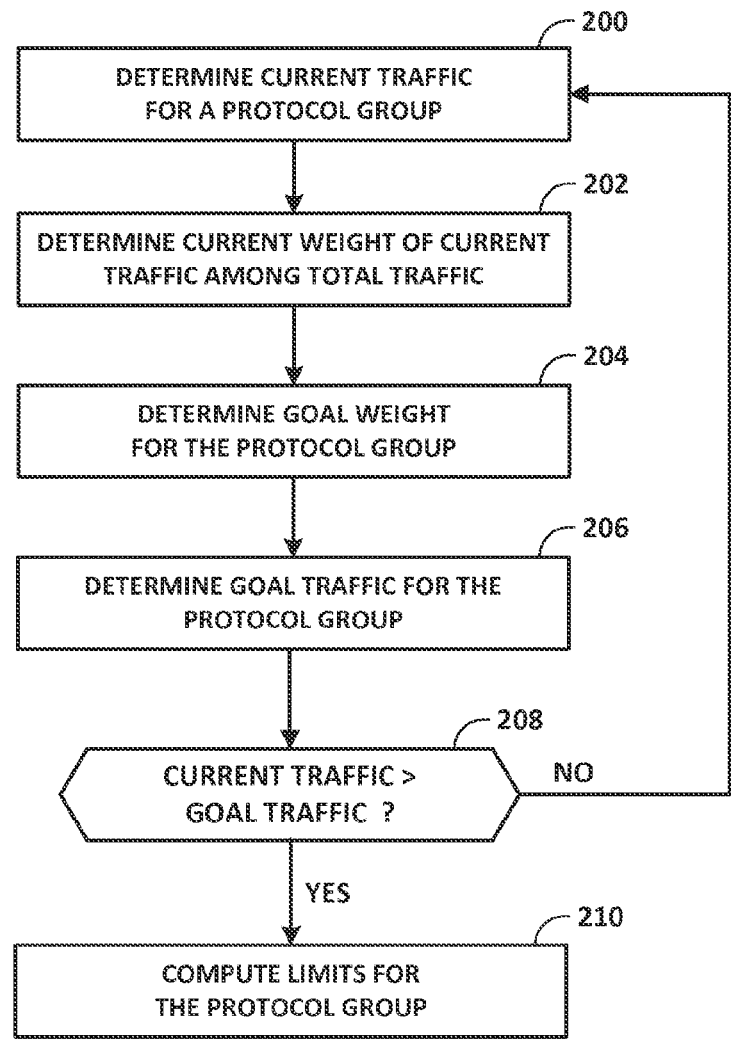
FIG. 5 is a flowchart illustrating an example mode of operation of forwarding unit components for determining whether a particular protocol group is consuming more than a fair share of host-bound path resources according to techniques described herein.

FIG. 5 is a flowchart illustrating an example mode of operation of forwarding unit components for determining whether a particular protocol group is consuming more than a fair share of host-bound path resources according to techniques described herein. The example mode of operation is described with respect to forwarding unit components illustrated in FIGS. 2-3, specifically with respect to protocol group 72A. For each of protocol groups 72, dynamic policer module 30 periodically determines whether the protocol group is greedy.

Limit computation module 82 determines current traffic for protocol group 72A for the previous period (200). Limit computation module 82 may, for instance, determine current traffic for protocol group 72A by summing packets received counters 78A$_1$-78A$_J$ of hash buckets 74A$_1$-74A$_J$ of protocol group hash table 74A. For other protocol groups, such as protocol group 72D categorized as per-protocol fairness, limit computation module 82 may determine current traffic for protocol group 72D by reading packets received counter 78D. Limit computation module 82 also determines a total traffic for protocol groups 72, which corresponds to a sum of the current traffic for each of protocol groups 72. Limit computation module 82 uses the total traffic to compute a current weight that is a percentage of traffic for protocol group 72A among the total traffic for all protocol groups 72 (202). In some examples, limit computation module 82 computes $$\text{current\_weight}_i = \frac{\text{current\_traffic}_i}{\sum_{\forall j} \text{current\_traffic}_j},$$

where i denotes protocol group 72A and j is used to index all protocol groups 72.

Limit computation module 82 reads the configured goal weight, a number that indicates a fair share of resources that may be consumed by the protocol group during congestion, from configuration data 75 for protocol group 72A (204). Limit computation module 82 then determines the "goal traffic" for protocol group 72A (206). In some examples, limit computation module 82 computes:

$$\text{goal\_traffic}_i = \frac{\left(\sum_{\forall j}, \text{current\_traffic}_j > _0\text{goal\_weight}_j\right)}{\text{current\_weight}_i} * \text{current\_traffic}_i,$$

where i denotes protocol group 72A and j is used to index all protocol groups 72. This computation requires computing the goal weight for all protocol groups 72 having non-zero traffic.

If the current traffic for protocol group 72A exceeds the goal traffic (YES branch of 208), protocol group 72A is greedy, and limit computation module 82 computes limits for protocol group 72A for potential application by a penalty-box policer (210). Example operations to compute limits for a protocol group are described below with respect to FIGS. 6-7. The sum of differences between current traffic and goal traffic among all protocol groups 72 is the total traffic to be discarded by penalty-box policers 24 in a subsequent period. Limit computation module 82 may compute goal traffic and current traffic in numbers of packets and transform these quantities to bytes as needed for byte limits of computed limits 73.

In some instances, congestion may exist but limit computation module 82 may determine that none of protocol groups 72 is greedy. In such instances, dynamic policing module 30 decreases traffic for each of protocol groups 72 proportionally. In some instances for such cases, limit computation module 82 recomputes goal traffic for each of protocol groups 72 as:

$$\text{goal\_traffic}_i *= \left(1 - 0.5 * \max\left(0, \frac{\text{QueueLength} - \text{LowWaterMark}}{\text{HighWaterMark} - \text{LowWaterMark}}\right)\right)$$

For congestion, a queue length of one or more of software queues 29 (QueueLength) is between a high water mark (HighWaterMark) and a low water mark (LowWaterMark). Limit computation module 82 separates the queue length into fifths from 1 to 5 at the high watermark and multiplies goal traffic by (1-fifth) to determine the new goal traffic per protocol group 72, including protocol group 72A. Limit computation module 82 compares the new goal traffic to the current traffic to determine whether protocol group 72A is greedy.

Figure 6:
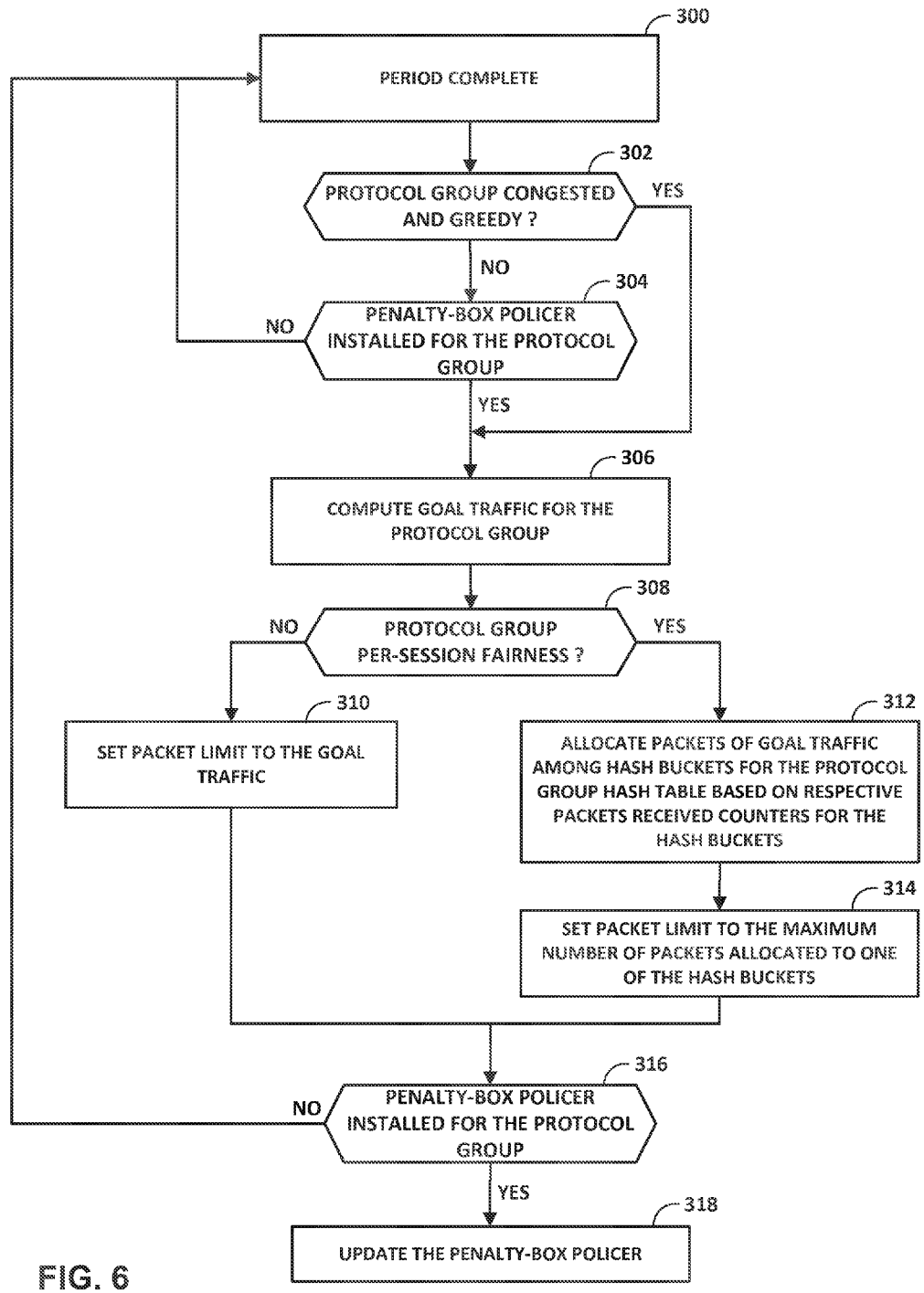
FIG. 6 is a flowchart illustrating an example mode of operation for computing limits and updating policers for a greedy protocol group according to techniques described in this disclosure.

FIG. 6 is a flowchart illustrating an example mode of operation for computing limits and updating policers for a greedy protocol group according to techniques described in this disclosure. The example mode of operation is described with respect to forwarding unit components illustrated in FIGS. 2-3.

At the expiry of a period, dynamic policing module 30 performs periodic tasks including computing packet limits of computed limits 73 for protocol groups 72 and updating existing penalty-box policers 24 for protocol group flows with computed packet limits transformed to bandwidth limits. Dynamic policing module 30 may perform the example mode of operation with respect to each of protocol groups 72. Initially, dynamic policing module 30 includes a timer or other mechanism for tolling periods, and a period expires (300). For each of protocol groups 72, if the host-bound path is congested and the protocol group is greedy (YES branch of 302), limit computation module 82 computes goal traffic for the protocol group (306). Even if the protocol group is not greedy or the host-bound path is not currently congested (NO branch of 302), if an existing penalty-box policer 24 is installed for a packet flow associated with the protocol group (YES branch of 304), limit computation module 82 computes goal traffic for the protocol group (306). Limit computation module 82 may compute goal traffic for the protocol group using techniques described above, e.g., with respect to FIG. 5. In some instances, the goal traffic for the protocol group is already computed for the period by limit computation module 82 to determine whether the protocol group is congested.

If the protocol group is not categorized as per-session fairness (NO branch of 308), then limit computation module 82 sets the packet limit for the protocol group in computed limits 73 to the computed goal traffic, which is computed in units of packets (310). If the protocol group is however categorized as per-session fairness (YES branch of 308), limit computation module 82 must allocate the goal traffic among the various hash buckets of the corresponding one of protocol group hash tables 74 for the protocol group.

Limit computation module 82 computes the packet limit for the protocol group based upon the protocol group's weighted fair share and the distribution of packets received counted into each of the hash buckets of the corresponding one of protocol group hash tables 74 for the protocol group ("hash buckets"). More specifically, limit computation module 82 allocates packets represented in the goal traffic quantity among the active (i.e., non-zero) hash buckets based on respective packets received counters 78 for the hash buckets (312). For example, if the protocol group is protocol group 72A corresponding to protocol group hash table 74A having hash buckets $74A_1$-$74A_J$, each having a corresponding one of packets received counters $78A_1$-$78A_J$, limit computation module 82 allocates goal traffic in accordance with the count of each non-zero one of packets received counters $78A_1$-$78A_J$. Conceptually, limit computation module 82 in this example performs unweighted round-robin among the hash buckets by handing out packet tokens (one for each packet of goal traffic) in turn to each active hash bucket until the hash bucket has as many packet tokens as packets received in the previous period or there are no remaining packet tokens. In some instances, hash function 91 hashes some flows to hash buckets of the corresponding one of protocol group hash tables 74 for the protocol group. Configuration data 75 or Class of Service information may specify that these flows should receive additional packet tokens, and in such cases, limit computation module 82 may perform weighted round-robin when allocating packet tokens. In some cases, limit computation module 82 exhausts the packet tokens. Again, the reference to allocating packet tokens is reference to a concept; limit computation module 82 may not allocate packet tokens as part of a limit computation algorithm. An example algorithm performed by limit computation module 82 to determine a packet limit is described in further detail with respect to FIGS. 7A-7C.

Limit computation module 82 sets the packet limit for the protocol group in computed limits 73 to the maximum number of packets (e.g., packet tokens) allocated to one of the hash buckets (314). In some cases, if limit computation module 82 did not exhaust the packet tokens corresponding to goal traffic, this value is the maximum number of packets hashed to any of the hash buckets. Otherwise, this value may be less than the number of packets of one or more of the hash buckets.

At this point in the example mode of operation, limit computation module 82 has determined the packet limit for the protocol group. If any of penalty-box policers 24 is active for a packet flow associated with the protocol group (YES branch of 316), policer manager 85 updates the penalty-box policers with the new packet limit by setting the bandwidth limit of the policers with the new packet limit transformed to bytes per second.

FIGS. 7A-7C illustrate an example computation of a packet limit for a protocol group in accordance with techniques described herein. FIG. 7A depicts a chart illustrating packets received by active hash buckets of one of protocol group hash tables 74 in a previous period. The eighteen active hash buckets are sorted in order of the number of packets received. For example, the fourth-most active hash bucket received five packets. Limit computation module 82 determines the number of packets received by reading packets received counters 78.

FIG. 7B is a table illustrating example variable values for iterations of an example limit computation algorithm applied by an example instance of a dynamic policing module executing in accordance with techniques described herein. In some examples, limit computation module 82 of dynamic policing module 30 executes the following algorithm (reproduced in pseudo-code) to compute a packet limit for a protocol group:

---

For protocol group i, sort the non-zero hash buckets in increasing order from 1 to K.
$bucket_0 = 0$
$unallocated\_traffic_i = goal\_traffic_i$
for (k = 1; k ≤ K; k++) {
   chunk_traffic = (K − k + 1) * ($bucket_k$ − $bucket_{k-1}$)
   if (chunk_traffic ≤ $unallocated\_traffic_i$)
   $unallocated\_traffic_i = unallocated\_traffic_i$ − chunk_traffic
   else {
$$limit_i = \frac{unallocated\_traffic_i}{K - k + 1} + bucket_{k-1}$$
   k = K + 1
   }
}
if ( $unallocated\_traffic_i$ > 0) {
$$limit_i = \frac{unallocated\_traffic_i}{(count\ of\ actively\ policed\ flows)} + bucket_K$$
}
$limit_i = min(high\_limit_i, max(low\_limit_i, limit_i))$

---

The above algorithm may be implemented using any suitable programming language, such as C/C++. In the above example, variables subscripted with i are indexed to a protocol group. Thus, $limit_4$ is the computed packet limit for protocol group 4 (e.g., protocol group 72D). The table depicted in FIG. 7B includes rows for variables of the above algorithm and columns for iterations of index k that correspond to the number of non-zero hash buckets. Data for $buckets_k$ is drawn from and sorted as depicted in FIG. 7A. For example, column k=4 shows the fourth-most active hash bucket as having received five packets in the previous period. The packet limit, $limit_i$, is bound by configurable values $high\_limit_i$, and $low\_limit_i$, which may correspond to the "Maximum limit" and "Minimum limit" configuration parameters described above with respect to Table 2.

In this instance, the goal weight ("goal_weight") for protocol group i is 15% and the ("current_weight") of protocol group i is 20%. The initial computations to compute current_traffic and goal_traffic for protocol group i are as follows:

$current\_traffic_i$=3+3+4+5+6+8+9+9+12+14+15+17+ 19+19+19+20+20+21=223 and $$goal\_traffic_i = 223 * \frac{15}{20} = 167.25 = unallocated\_traffic_i$$

With this data, the execution thread exits the for loop of the algorithm at k=10. Thus:

$$limit_i = \frac{unallocated\_traffic_i}{K - k + 1} + bucket_{k-1} = \frac{0.25}{9} + 12 = 12.02778$$

Limit computation module 82 rounds $limit_i$ down such that the packet limit, $limit_i$, for protocol group i equals 12. Subsequently, policer manager 85 as part of periodic update to penalty-box policers 24 or add policer module 83 as part of traffic-driven penalty-box policer addition may configure a policer for protocol group i with the packet limit. FIG. 7C depicts a chart showing application, to subsequent received packet flows, by one of penalty-box policers 24 to packet flows of protocol group i.

The above algorithm holds on the assumption that each non-zero hash bucket be associated with a single packet flow. In some instances, hash function 91 hashes multiple packets to a single hash bucket of a corresponding one of protocol group hash tables 74 for one of protocol groups 72. In such instances, limit computation module 82 may attempt to identify hash buckets having more than a single packet flow by determining whether the packet received counter 78 for a hash bucket is greater than a previous period's computed packet limit. This may indicate that hash function 91 is hashing multiple flows to the hash bucket, since hash function 91 may in some instance be seeded differently for each period, as described above.

When limit computation module 82 identifies one or more hash bucket for a protocol group hash table 74 having multiple packet flows, limit computation module 82 may split each hash bucket into multiple buckets, where the number of buckets is equal to the number of packets received hash bucket (per the packets received counter 82) divided by the packet limit in computed limits 73 computed for a previous period, plus one. For example, if the packet limit is 10 and the packets received counter 82 for a hash bucket is 23, limit computation module 82 splits the hash bucket into (23/10)+1=3 buckets for the above algorithm. Limit computation module 82 allocates the packet limit value of packets to the first N−1 buckets, where N is the number of new buckets created by the split, and allocates the remainder to the Nth bucket. Thus, for the above example, bucket$_0$=10 packets, bucket$_1$=10 packets, and bucket$_3$=3 packets. Limit computation module 82 replaces the multiple packet flow hash bucket with the conceptually split buckets generated per the above description in the algorithm, and sorts the conceptually split buckets along with the other active hash buckets during the initial steps of the algorithm.

Limit computation module 82 may in some cases identify one or more hash buckets by identifying hash buckets having received byte counts that exceed a byte limit computed for the corresponding one of protocol groups 72 in a previous period. In such cases, limit computation module 82 performs a process similar to that described above with respect to packet limits to split the hash bucket into multiple conceptual buckets for use in the above algorithm. To associate a packet count with each of the conceptual buckets, limit computation module 82 may split the actual packet count from the corresponding received packets counter 80 for the hash bucket proportionally among the conceptual buckets.

In some examples, dynamic policing module 30 sets a multiple flows bit for a bucket if an incoming packet does not have the collision hash. In such examples, limit computation module 82 can use the multiple flows bit to provide guidance for the above algorithm on splitting a hash bucket into multiple buckets.

If a protocol group 72 is not greedy, then its goal traffic is greater than its current traffic, and the byte limit for the protocol group will allow more traffic that was received in the previous period. This is predicated on the assumption that all policed network flows will use up to the computed byte limit. Whenever a protocol group is not congested or greedy, it may be beneficial for dynamic policing module 30 to use the maximum packet limit computed since the protocol group was last congested and/or greedy, rather than the packet limit computed for the previous period. This may reduce variation caused by differences in traffic load from other protocol groups and minimize unnecessary updates.

Figure 8:
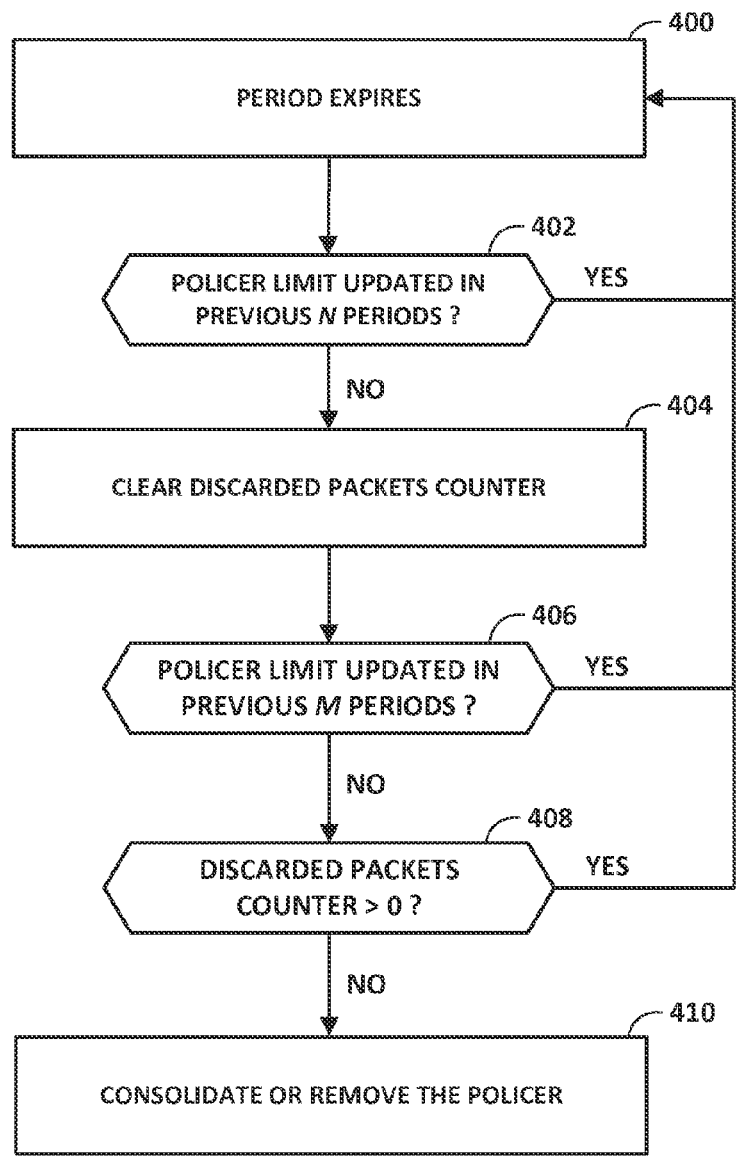
FIG. 8 is a flowchart illustrating an example mode of operation of a dynamic policing module to remove penalty-box policers according to techniques described herein.

FIG. 8 is a flowchart illustrating an example mode of operation of a dynamic policing module to remove penalty-box policers according to techniques described herein. In this example, a period expires (400), and policer manager 85 determines whether a bandwidth limit for a policer of penalty-box policers 24 has been updated in a previous N periods (402). In some instances, N=5. Policer manager 85 may directly read the policer or read a packet or byte limit in computed limits 73 for an associated one of protocol groups 72.

If the policer limit has not been updated in the previous N periods (NO branch of 402), policer manager 85 clears the discarded packets counter of policer, which counts the number of packets discarded by operation of the policer (404). Policer manager 85 again determines whether a bandwidth limit for a policer of penalty-box policers 24 has been updated in a previous M periods (406). In some instances, M=5. If the bandwidth limit has not been updated (NO branch of 406), policer manager 85 reads the discarded packets counter for the policer (408). If the policer has not discarded any packets since being cleared (NO branch of 408), policer manager 85 removes the policer from penalty-box policers 24.

Policer manager 85 may perform the above operation with respect to some or all of penalty-box policers 24 after each period. In some instances, policer manager 85 checks a fixed number of penalty-box policers 24 after each period.

In some cases, one or more of penalty-box policers 24 may be discarding packets but could be removed without causing congestion of the host-bound path. In such cases, dynamic policing module 30 may determine an amount of available host-bound path bandwidth (or "slack") and remove one or more penalty-box policers 24 to reduce the slack/fill the available bandwidth. For example, dynamic policing module 30 may compute a difference, in packets, between a configured high watermark for a software queue 29 and the existing length of the software queue 29. For a policer that policer manager 85 has determined to have an unchanged bandwidth limit over the prescribed number of periods (per the above example mode of operation, for instance) while also discarding packets (i.e., the discarded packets counter for the policer is non-zero), policer manager 85 determines whether removing the still-active policer would cause the slack to be exceeded. For instance, policer manager 85 may divide the discarded packets counter for the policer by the number of periods (M) since clearing the discarded packets counter. This value estimates the number of packets that would be added to the host-bound path each period. If the value is less than the remaining slack, policer manager 85 may remove the policer and reduce the remaining slack by the value.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
executing, with a control unit that provides a control plane of a network device, protocols each associated with one or more protocol groups, wherein each protocol group of the one or more protocol groups is associated with a goal weight that defines a share of host-bound path resources available to the protocol group for a host-bound path from a forwarding unit of the network device to the control unit, and wherein at least one protocol of the protocols comprises a routing protocol;
receiving, with the forwarding unit of the network device, a plurality of packet flows that each comprises host-bound traffic destined for the control unit, wherein the forwarding unit comprises a forwarding unit processor and a forwarding component that processes the packet flows and forwards the packet flows to the control unit via the host-bound path of the network device,
wherein a first packet flow of the packet flows is associated with a first protocol group of the protocol groups associated with a first goal weight;
with the forwarding unit processor and in response to detecting congestion of the host-bound path from the forwarding component to the control unit that is caused by forwarding the packet flows, determining that host-bound traffic for the first protocol group exceeds the first goal weight;
with the forwarding unit processor and in response to the determining, selecting the first packet flow of the packet flows to constrain based at least on the association of the first packet flow with the first protocol group and configuring a policer of the forwarding component with one or more identifying features for the first packet flow to constrain a rate at which the forwarding component forwards the first packet flow to the control unit.

2. The method of claim 1, wherein the detecting congestion further comprises:
computing a current traffic of the host-bound traffic for the first protocol group;
determining a current weight of the current traffic among total host-bound traffic of the plurality of packet flows;
determining a goal traffic for the first protocol group based at least on the first goal weight and the current traffic of the host-bound traffic for the first protocol group; and
when the current traffic exceeds the goal traffic, computing a limit for the first protocol group, wherein constraining the rate at which the forwarding component forwards the first packet flow to the control unit on the host-bound path comprises constraining the rate of the first packet flow to the limit computed for the first protocol group.

3. The method of claim 1, further comprising:
in response to detecting, with the forwarding unit processor, the host-bound path is not congested, configuring the policer of the forwarding component to no longer constrain the rate at which the forwarding component forwards the first packet flow to the control unit.

4. The method of claim 1, further comprising:
computing a goal traffic for the first protocol group based at least on the first goal weight for the first protocol group.

5. The method of claim 4, wherein constraining the rate at which the forwarding component forwards the first packet flow to the control unit on the host-bound path comprises constraining the rate of the first packet flow to the goal traffic.

6. The method of claim 4, wherein a second packet flow is associated with the first protocol group, the method further comprising:
allocating numbers of packets of the goal traffic among the first packet flow and second packet flow based at least on respective amounts of packets received by the network device for the first packet flow and the second packet flow,
wherein constraining the rate at which the forwarding component forwards the first packet flow to the control plane on the host-bound path comprises constraining the rate of the first packet flow to the number of packets of the goal traffic allocated to the first packet flow.

7. The method of claim 6, further comprising:
for each packet of the first packet flow received, incrementing a packets received counter of a first hash bucket of a protocol group hash table; and
for each packet of the second packet flow received, incrementing a packets received counter of a second hash bucket of the protocol group hash table,
wherein allocating numbers of packets of the goal traffic among the first and second packet flow based at least on respective amounts of packets received by the network device for the first packet flow and the second packet flow comprises:
allocating a first number of packets of the goal traffic to the second packet flow equal to a value of the packets received counter of the second hash bucket; and
allocating a remaining number of packets of the goal traffic to the first packet flow.

8. The method of claim 4, further comprising:
computing a limit for the first protocol group;
receiving a packet of the first packet flow and incrementing a packets received counter for the first packet flow;
determining a value of the packets received counter for the first packet flow exceeds the limit computed for the first protocol group; and
wherein configuring the policer comprises configuring the policer to limit the first packet flow to the limit computed for the first protocol group.

9. The method of claim 1,
wherein the forwarding unit comprises a first one of a plurality of forwarding units of the network device, the method further comprising:
receiving a second packet flow comprising host-bound traffic with a second one of the forwarding units, wherein the second packet flow matches the one or more identifying features for the first packet flow, and wherein a forwarding component of the second forwarding unit forwards the second packet flow to the control unit,
wherein the forwarding component of the second forwarding unit forwards the second packet flow unconstrained to the control unit concurrently with the policer constraining the rate at which the forwarding component of the first forwarding unit forwards the first packet flow to the control unit.

10. A method comprising:
receiving, with a forwarding unit that provides a forwarding plane of a network device, a plurality of packet flows that each comprises host-bound traffic destined for the network device and forwarding the packet flows on a host-bound path from the forwarding unit to a control unit that provides a control plane of the network device;

executing, with the control unit, protocols each associated with one or more protocol groups, wherein each of the protocol groups is associated with a goal weight that defines a share of host-bound path resources available to the protocol groups for a host-bound path from the forwarding unit to the control unit, and wherein a first packet flow of the plurality of packet flows is associated with a first one of the protocol groups associated with a first goal weight;

determining host-bound traffic for the first protocol group on the host-bound path from the forwarding unit to the control unit exceeds the first goal weight; and in response to determining the host-bound traffic for the first protocol exceeds the first goal weight, selecting the first packet flow to constrain based at least on the association of the first packet flow with the first protocol group and configuring the forwarding unit to constrain a rate at which the forwarding unit forwards the first packet flow to the control unit.

11. A network device comprising:

a control unit comprising one or more processors, the control unit configured to provide a control plane;

a forwarding unit comprising a forwarding unit processor and a forwarding component;

one or more host processes of the control unit configured to execute protocols each associated with one or more protocol groups, wherein each protocol group of the one or more protocol groups is associated with a goal weight that defines a share of host-bound path resources available to the protocol group for a host-bound path from the forwarding unit to the control unit, and wherein at least one protocol of the protocols comprises a routing protocol, wherein the forwarding unit is configured to receive a plurality of packet flows that each comprises host-bound traffic destined for the control unit, wherein the forwarding component is configured to process the packet flows and forward the packet flows to the control unit via the host-bound path of the network device, wherein a first packet flow of the packet flows is associated with a first protocol group of the protocol groups associated with a first goal weight; and a dynamic policing module configured for execution by the forwarding unit processor to, in response to detecting congestion of the host-bound path from the forwarding component to the control unit that is caused by forwarding the packet flows, determine that host-bound traffic for the first protocol group exceeds the first goal weight, wherein the dynamic policing module is configured to, in response to the determining, select the first packet flow of the packet flows to constrain based at least on the association of the first packet flow with the first protocol group and configure a policer of the forwarding component with one or more identifying features for the first packet flow to constrain a rate at which the forwarding component forwards the first packet flow to the control unit.

12. The network device of claim 11, wherein the dynamic policing module is configured to compute a current traffic of the host-bound traffic for the first protocol group, wherein the dynamic policing module is configured to determine a current weight of the current traffic among total host-bound traffic of the plurality of packet flows, wherein the dynamic policing module is configured to determine a goal traffic for the first protocol group based at least on the first goal weight and the current traffic of the host-bound traffic for the first protocol group, wherein the dynamic policing module, when the current traffic exceeds the goal traffic, is configured to compute a limit for the first protocol group, and wherein constraining the rate at which the forwarding component forwards the first packet flow to the control unit on the host-bound path comprises constraining the rate of the first packet flow to the limit computed for the first protocol group.

13. The network device of claim 11, further comprising:

wherein the dynamic policing module is configured to detect the host-bound path is not congested and, in response, configure the policer of the forwarding component to longer constrain the rate at which the forwarding component forwards the first packet flow to the control unit.

14. The network device of claim 11, wherein the dynamic policing module is configured to compute a goal traffic for the first protocol group based at least on the first goal weight for the first protocol group.

15. The network device of claim 14, wherein constraining the rate at which the forwarding component forwards the first packet flow to the control unit on the host-bound path comprises constraining the rate of the first packet flow to the goal traffic.

16. The network device of claim 14, wherein a second packet flow is associated with the first protocol group, wherein the dynamic policing module is configured to allocate numbers of packets of the goal traffic among the first packet flow and second packet flow based at least on respective amounts of packets received by the network device for the first packet flow and the second packet flow, and wherein constraining the rate at which the forwarding component forwards the first packet flow to the control plane on the host-bound path comprises constraining the rate of the first packet flow to the number of packets of the goal traffic allocated to the first packet flow.

17. The network device of claim 16, further comprising:

a protocol group hash table comprising a plurality of hash buckets each comprising a packets received counter, wherein the dynamic policing module, for each packet of the first packet flow received, is configured to increment a packets received counter of a first hash bucket of a protocol group hash table, wherein the dynamic policing module, for each packet of the second packet flow received, is configured to increment a packets received counter of a second hash bucket of the protocol group hash table, and wherein the dynamic policing module is configured to allocate numbers of packets of the goal traffic among the first and second packet flow based at least on respective amounts of packets received by the network device for the first packet flow and the second packet flow by:

allocating a first number of packets of the goal traffic to the second packet flow equal to a value of the packets received counter of the second hash bucket; and allocating a remaining number of packets of the goal traffic to the first packet flow.

18. The network device of claim 14,
wherein the dynamic policing module is configured to compute a limit for the first protocol group,
wherein, upon the forwarding component receiving a packet of the first packet flow, the dynamic policing module is configured to increment a packets received counter for the first packet flow,
wherein the dynamic policing module is configured to determine a value of the packets received counter for the first packet flow exceeds the limit computed for the first protocol group, and
wherein the dynamic policing module is configured to configure the policer to limit the first packet flow to the limit computed for the first protocol group.

19. The network device of claim 11, further comprising:
a plurality of forwarding units, wherein the forwarding unit comprises a first one of a plurality of forwarding units,
wherein a second one of the forwarding units is configured to receive a second packet flow comprising host-bound traffic, wherein the second packet flow matches the one or more identifying features for the first packet flow, and wherein a forwarding component of the second forwarding unit is configured to forward the first packet flow to the control unit,
wherein the forwarding component of the second forwarding unit is configured to forward the second packet flow unconstrained to the control unit concurrently with the policer constraining the rate at which the forwarding component of the first forwarding unit forwards the first packet flow to the control unit.

20. A network device comprising:
a forwarding unit configured to provide a forwarding plane; and
a control unit configured to provide a control plane and execute protocols each associated with one or more protocol groups, wherein each of the protocol groups is associated with a goal weight that defines a share of host-bound path resources available to the protocol groups for a host-bound path from the forwarding unit to the control unit,
wherein the forwarding unit is configured to receive a plurality of packet flows that each comprises host-bound traffic destined for the network device and to forward the packet flows on a host-bound path from the forwarding unit to the control unit, wherein a first packet flow of the plurality of packet flows is associated with a first one of the protocol groups associated with a first goal weight,
wherein the control unit is configured to determine whether host-bound traffic for the first protocol group exceeds the first goal weight,
wherein the control unit is configured to, in response to determining the host-bound traffic for the first protocol on the host-bound path from the forwarding unit to the control unit exceeds the first goal weight, select the first packet flow to constrain based at least on the association of the first packet flow with the first protocol group, and
wherein the control unit is configured to configure the forwarding unit to constrain a rate at which the forwarding unit forwards the first packet flow to the control unit.

21. The method of claim 1, wherein the host-bound traffic includes a destination address that is a network address of the network device.

22. The method of claim 1, wherein the rate is based on a weight associated with a first protocol group and an amount of the host-bound traffic, wherein the weight defines a share of host-bound path resources available to a first protocol group among a plurality of protocol groups.

23. The network device of claim 11, wherein the host-bound traffic includes a destination address that is a network address of the network device.

24. The network device of claim 11, wherein the rate is based on a weight associated with a first protocol group and an amount of the host-bound traffic, wherein the weight defines a share of host-bound path resources available to a first protocol group among a plurality of protocol groups.

* * * * *